United States Patent [19]
Akagi

[11] Patent Number: 5,376,473
[45] Date of Patent: Dec. 27, 1994

[54] FUEL CELL SYSTEM
[75] Inventor: Kosuke Akagi, Osaka, Japan
[73] Assignee: Osaka Gas Co., Ltd., Osaka, Japan
[21] Appl. No.: 109,670
[22] Filed: Aug. 20, 1993
[30] Foreign Application Priority Data Aug. 20, 1992 [JP] Japan .................. 4-221174
May 26, 1993 [JP] Japan .................. 5-123699

[51] Int. Cl.5 ............... H01M 2/00; H01M 2/02; H01M 2/14
[52] U.S. Cl. ............... 429/34; 429/38; 429/39
[58] Field of Search ............... 429/34, 38, 39

[56] References Cited
U.S. PATENT DOCUMENTS

| | | | |
|---|---|---|---|
| 5,023,152 | 6/1991 | Akagi | 429/38 |
| 5,049,459 | 9/1991 | Akagi | 429/38 |
| 5,208,115 | 5/1993 | Akagi | 429/39 |
| 5,252,409 | 10/1993 | Akagi | 429/39 |
| 5,286,579 | 2/1994 | Akagi | 429/38 |
| 5,288,562 | 2/1994 | Taniguchi et al. | 429/34 |

FOREIGN PATENT DOCUMENTS
0406523 9/1991 European Pat. Off. .
3276566 6/1991 Japan .

Primary Examiner—Wayne Langel
Attorney, Agent, or Firm—Gifford, Groh, Sprinkle, Patmore and Anderson

[57] ABSTRACT

A fuel cell system in which first partition members are arranged in a substantially parallel pair, with opposite end faces thereof placed in tight contact with contact surfaces of columns. One cell is placed on the pair of first partition members. Second partition members are placed between the cell and the columns such that end faces of the second partition members are in tight contact with the contact surfaces of the columns. Then, a further pair of first partition members is stacked on the cell and second partition members. This construction is repeated to form a cell assembly.

36 Claims, 26 Drawing Sheets

Fig. 25
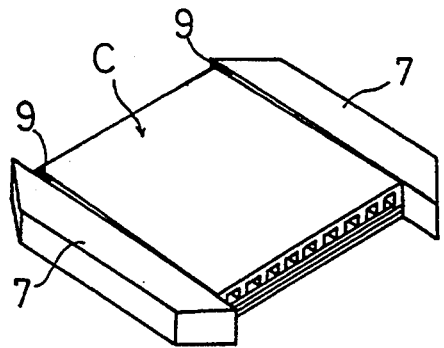
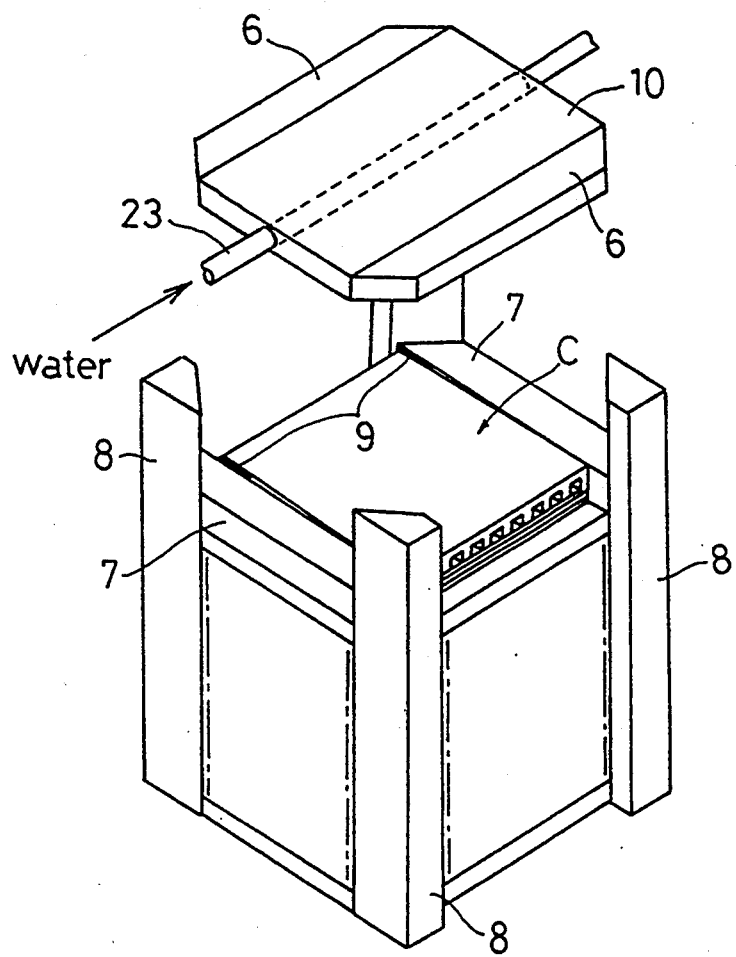
water

FUEL CELL SYSTEM

BACKGROUND OF THE INVENTION

1. Field of the Invention

The present invention relates to a fuel cell system, and more particularly to a fuel cell system having a plurality of fuel cells stacked to form a cell assembly, with several types of partition members separating the fuel cells.

2. Description of the Related Art

A conventional fuel cell system as noted above is shown in FIG. 26. This fuel cell system includes pairs of first opposed elongate partition members 21 and pairs of second opposed elongate partition members 22 stacked alternately in parallel crosses. With each cell C, opposite sides defining openings of intracellular passages p1 are disposed above the first partition members 21, while opposite sides having no such openings are flanked by the second partition members 22. This arrangement is repeated to form a cell assembly NC including a plurality of rectangular plate-like cells C stacked in a spaced relationship. An intercellular passage p2 is defined between an adjacent pair of cells C. The intracellular passages p1 and intercellular passages p2 are partitioned from each other in gastight condition by tight contact between cells C and first partition members 21 and between cells C and second partition members 22.

Gas passage defining members 11 are connected to the four sides of the cell assembly NC, respectively. Each gas passage defining member 11 is box-shaped, for example, with one opening side thereof connected to one side of the cell assembly NC. The pair of gas passage defining members 11 connected in communication with the intracellular passages p1 provide an oxygen-containing gas supply passage Ks and an oxygen-containing gas exhaust passage Hs, respectively. The pair of gas passage defining members 11 connected in communication with the intercellular passages p2 provide a fuel gas supply passage Kf and a fuel gas exhaust passage Hf, respectively. However, the above known fuel cell system has a problem concerning the connection between the sides of the cell assembly NC and the gas passage defining members 11. One side surface of the cell assembly NC, for example, is defined by side surfaces 21B of the first partition members 21 and end faces 22A of the second partition members 22. This side surface of the cell assembly NC tends to be uneven because of dimensional errors in the partition members 21 and 22. It is therefore necessary to provide very complicated sealing structures in positions of connection between the gas passage defining member 11 and the side surface of the cell assembly NC. Alternatively, the partition members 21 and 22 and the like must be finished with increased precision. This in turn increases manufacturing cost, to render the system impracticable.

SUMMARY OF THE INVENTION

The present invention has been made having regard to the state of the art noted above, and its object is to provide a fuel cell system with an improvement to absorb dimensional errors in components used in stacking a plurality of cells and to simplify sealing structures used in connecting gas passage defining members.

The above object is fulfilled, according to the present invention, by a fuel cell system having the following characterizing features.

Columns are erected along corners of the cell assembly, respectively. Each of the columns have a planar contact surface extending longitudinally thereof. The contact surface is directed inwardly of the cell assembly as seen in a stacking direction of the cell assembly. First and second partition members are fixed in tight contact with the columns. The first and second partition members have end faces for making tight contact with the contact surfaces of the columns.

First, each of first partition members is moved in a direction outwardly of the cell assembly and substantially perpendicular to the stacking direction, into contact with two of the columns. The opposite end surfaces of each of the first partition members are pressed against the contact surfaces of the two columns. In this way, the first partition members are arranged in a substantially parallel pair. Next, a cell is mounted to bridge the pair of first partition members. In this state, the cell is out of contact with the columns. Subsequently, the second partition members are arranged between the columns and cell to fix the cell in a region surrounded by the columns. At this time the second partition members are placed in tight contact with the columns. The second partition members and cell have substantially the same thickness in the stacking direction of the cells. A further pair of first partition members is placed on the cell and second partition members. Then, a further cell and further second partition members are arranged as above. These steps are repeated to stack a plurality of cells to form the cell assembly.

According to this construction, the first and second partition members could be placed in tight contact with the contact surfaces of the columns even if dimensional errors should occur with the first and second partition members. Thus, this construction is capable of absorbing dimensional errors of the first and second partition members. Where gas passage defining members are provided at sides of the cell assembly, an opening side of each gas passage defining member is connected to two of the columns. This construction does not require a complicated sealing operation as in the prior art, even if the sides of the cells define uneven side surfaces of the cell assembly. Not only are the sealing structures for the gas passage defining members simplified, but improved sealing performance is assured according to the present invention.

Further and other objects, features and effects of the invention will become apparent from the following more detailed description of the embodiments of the invention taken with reference to the accompanying drawings.

BRIEF DESCRIPTION OF THE DRAWINGS

FIG. 25 is an exploded perspective view of a fuel cell system in an eleventh embodiment of the invention.

DETAILED DESCRIPTION OF THE PREFERRED EMBODIMENTS

Figure 1A:
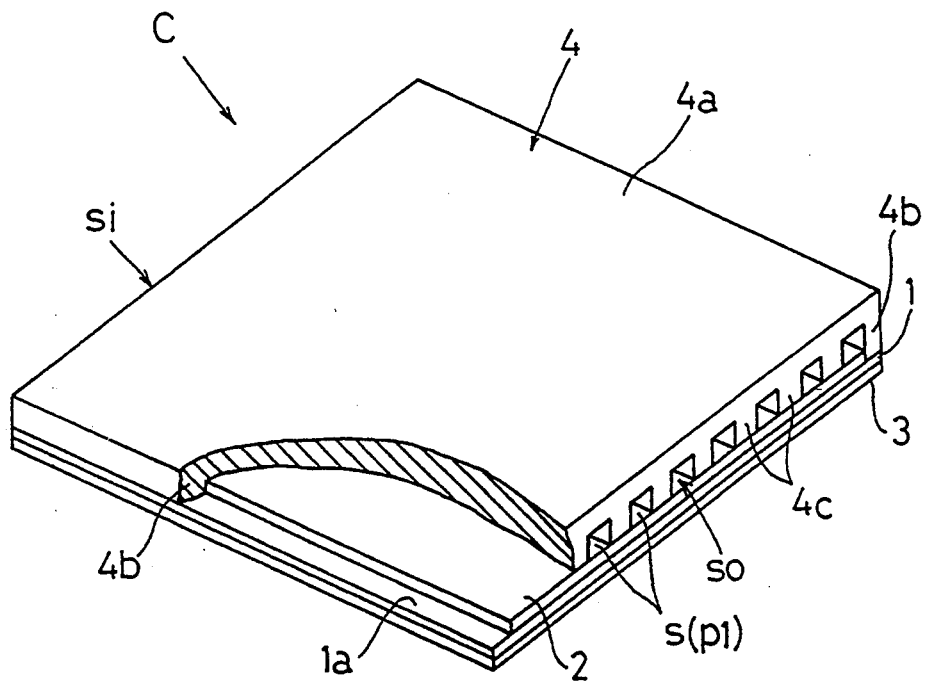
FIGS. 1 (a) and (b) are perspective views, partly broken away, each showing a cell for use in a fuel cell system according to the present invention.

Fuel cell systems according to the present invention will be described in detail with reference to the drawings.

First, cells C in the fuel cell systems will be described referring to FIG. 1 (a).

Each cell C has an electrolyte layer 1 in the form of a rectangular plate, and an oxygen electrode 2 in the form of a layer or plate applied to one surface of the electrolyte layer 1. The electrolyte layer 1 includes an electrolyte exposing portion 1a extending along an entire length of each of two opposite parallel edges of the four edges thereof. A fuel electrode 3 also in the form of a layer or plate is applied to the other surface of the electrolyte layer 1 to extend substantially over an entire area thereof. Thus, the cell C has a three-layer plate structure of rectangular shape, to derive an electromotive force from the oxygen electrode 2 and fuel electrode 3.

The electrolyte layer 1 is formed of tetragonal zirconia which is a solid solution of ytterbia in about 3 mol%, or other appropriate material. The oxygen electrode 2 is formed of lanthanum-manganese oxide or other appropriate material. The fuel electrode 3 is formed of a cermet of nickel and zirconia or other appropriate material.

Numeral 4 denotes a conductive separator. The separator 4 includes a plate-like portion 4a, strip-shaped projections 4b extending along a pair of parallel edges of four edges of the plate-like portion 4a, and a plurality of ridges 4c arranged between the strip-shaped projections 4b. The separator 4 is attached to the oxygen electrode 2 of the three-layer structure. The pair of strip-shaped projections 4b and electrolyte exposing portions 1a allow the plurality of ridges 4c to contact the oxygen electrode 2. The above is the construction of each cell C.

Thus, the oxygen electrode 2 and conductive separator 4 are connected to each other in conductive state to define a plurality of intracellular passages p1 therebetween. These intracellular passages p1 act as oxygen-containing gas passages "s".

The intracellular passages p1 extend between two opposite sides of the cell C. Openings of the intracellular passages p1 in one of these sides act as oxygen-containing gas inlets "si", while openings in the other side act as oxygen-containing gas outlets "so".

The conductive separator 4 is formed of lanthanum-chromium oxide or other appropriate material that has excellent resistance to oxidation and reduction. FIG. 1 (b) shows a different example of cells C usable in the fuel cell system.

Figure 1B:
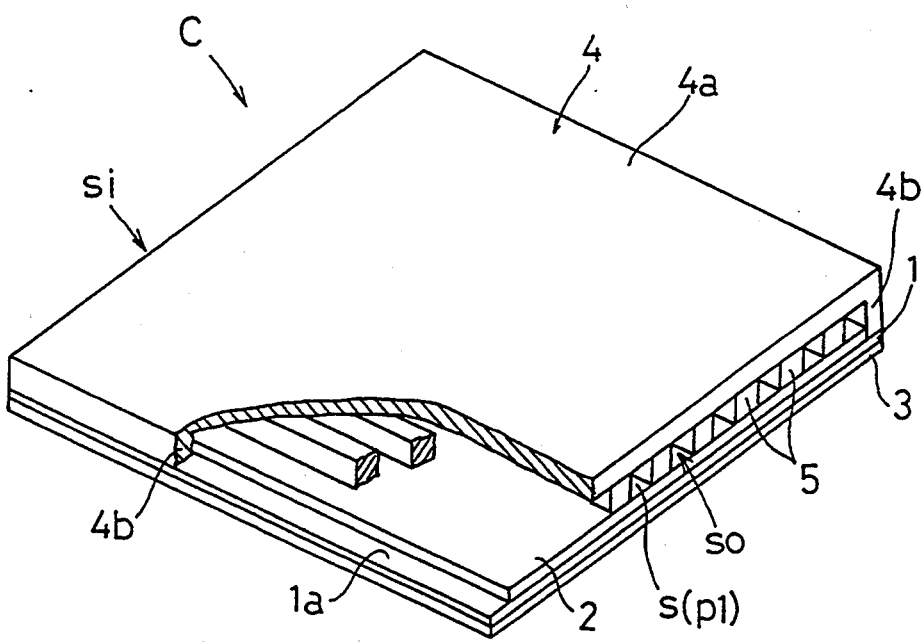

This cell C employs oxygen-side conductive members 5 in place of the ridges 4c in the cell C of FIG. 1 (a). This allows the conductive separator 4 to have a simplified configuration easy to manufacture. By selecting a size of the oxygen-side conductive members 5, it is possible to adjust areas of the oxygen-gas containing gas passages or to adjust sectional areas of electric paths between the separator 4 and oxygen electrode 2. The oxygen-side conductive members 5 may be formed of a soft material, which would absorb gap variations between the separator 4 and oxygen electrode 2 due to manufacturing errors.

The oxygen-side conductive members 5 are formed of lanthanum-chromium oxide or other appropriate material that has excellent resistance to heat and oxidation.

Cell assemblies NC embodying the present invention will be described next, in which a plurality of cells C having the rectangular plate structure noted above are stacked one over another.

Figure 2:
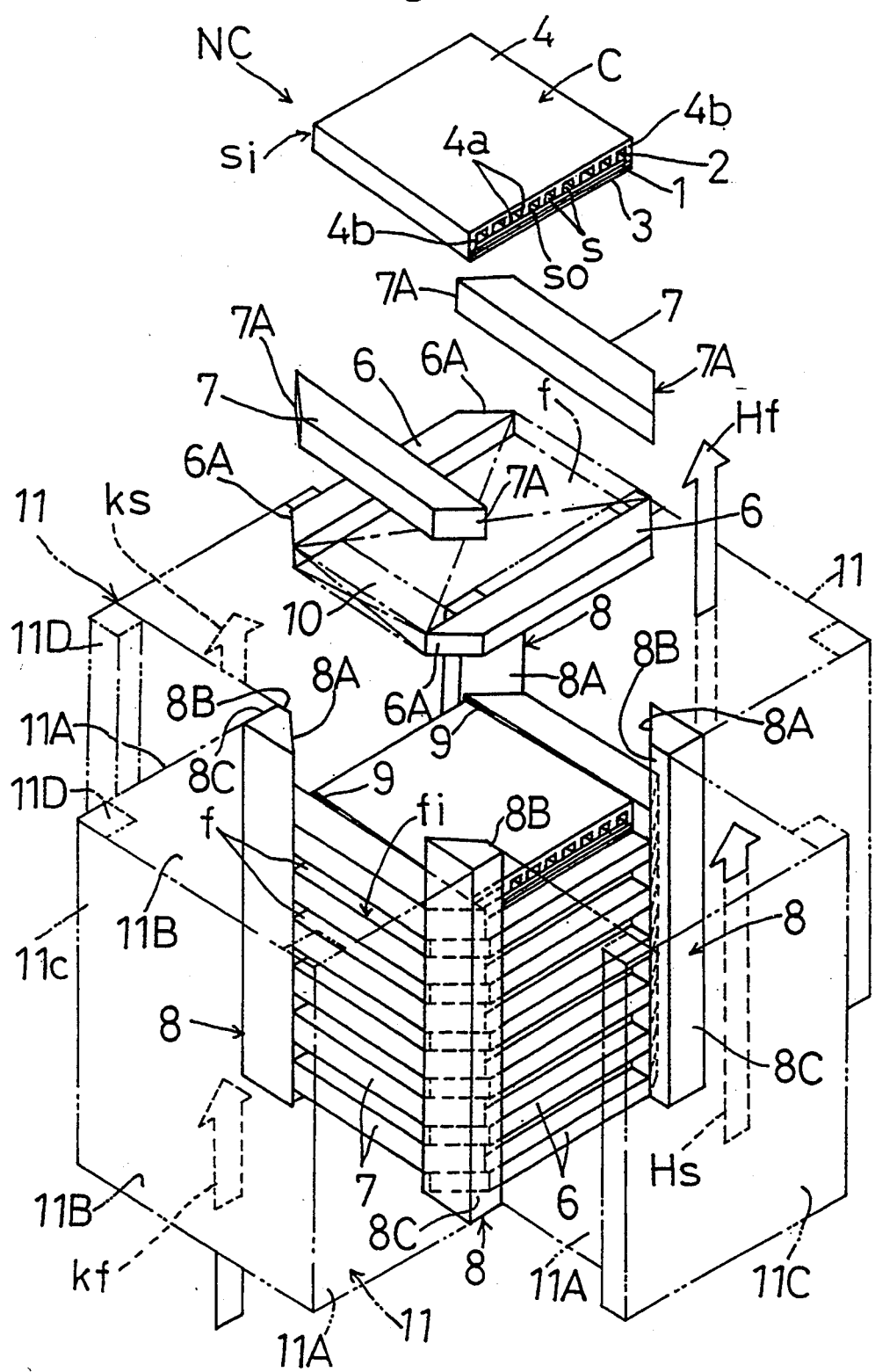
FIG. 2 is an exploded perspective view of a fuel cell system in a first embodiment of the invention.
Figure 3:
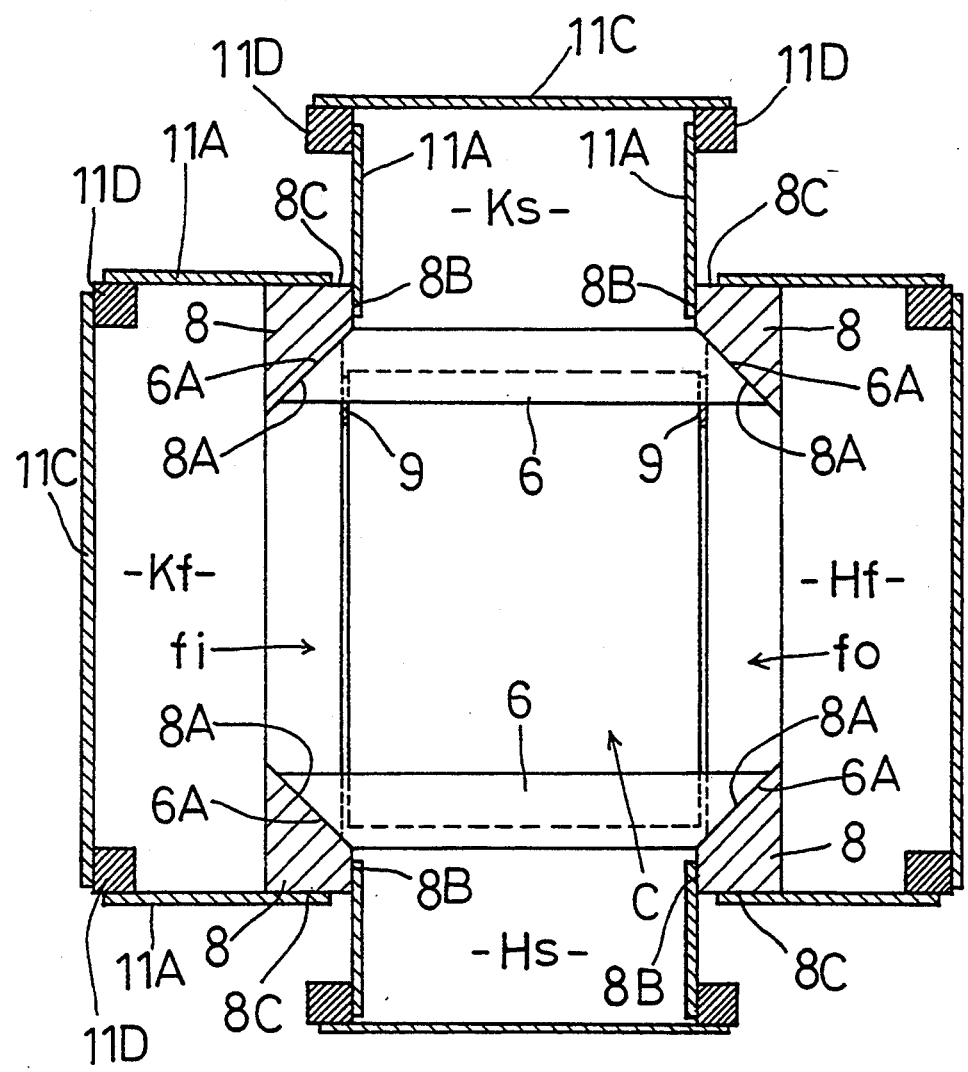
FIG. 3 is a sectional plan view of the fuel cell system in the first embodiment, showing upper surfaces of first partition members.
Figure 4:
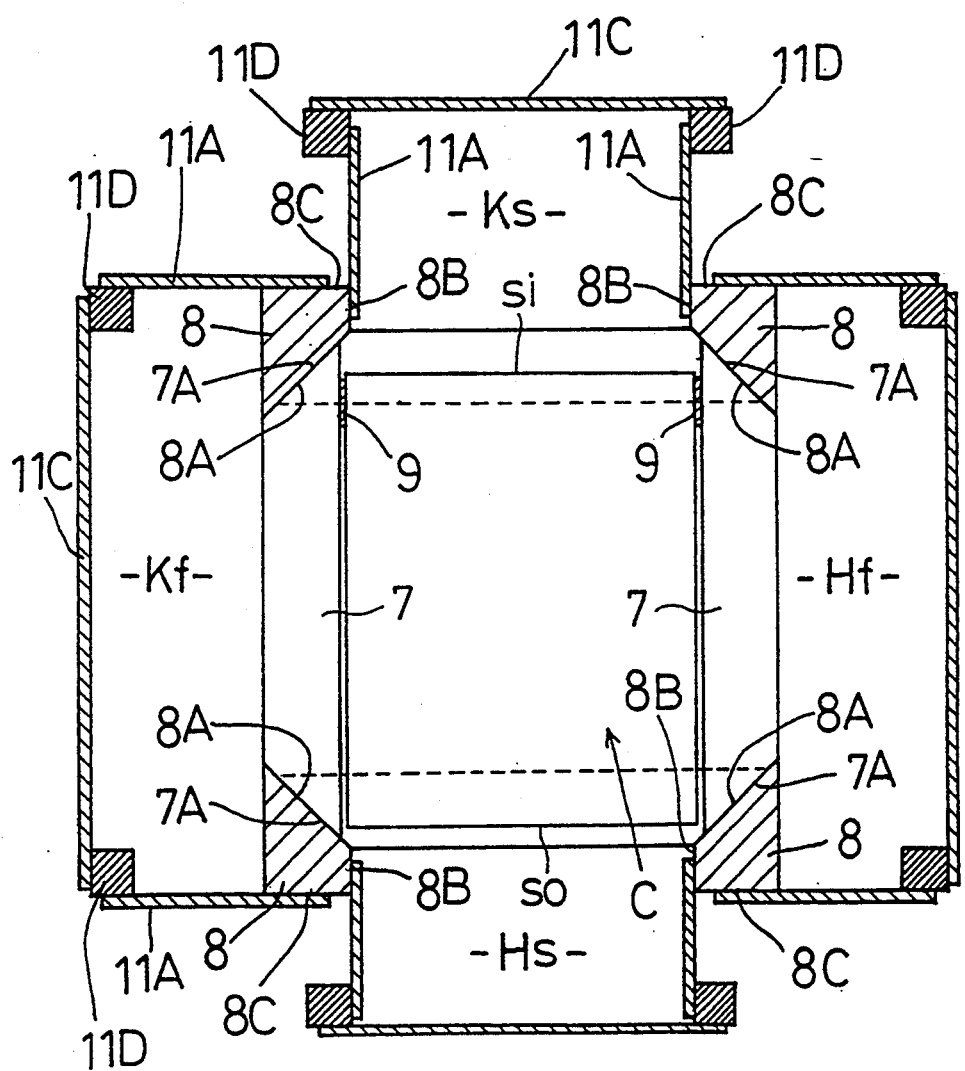
FIG. 4 is a sectional plan view of the fuel cell system in the first embodiment, showing upper surfaces of second partition members.

FIGS. 2 through 4 show a first embodiment.

For stacking the cells C: this embodiment employs pairs of first opposed elongate partition members 6 in the form of square bars and pairs of second opposed elongate partition members 7 also in the form of square bars. Each cell C is placed on one pair of first partition members 6 extending parallel to each other. In this state, the sides of the cell C defining the openings of the intracellular passages p1 lie above the pair of first partition members 6. Then, one pair of second partition members 7 is placed in contact with the sides of the cell C defining no passage openings. Thus, a cell assembly NC is formed to include the first and second partition members 6 and 7 stacked alternately in parallel crosses, with the cells C arranged therein.

A column 8 is erected along each of the four corners of the cell assembly NC. Each column 8 includes a contact surface 8A extending longitudinally thereof, which, as seen in a stacking direction of the cell assembly NC, crosses two sides of the cell assembly NC continuous with the corner opposed to the contact surface 8A. On the other hand, each first partition member 6 and each second partition member 7 have inclined opposite end surfaces 6A and 7A, respectively. The contact surface 8A of each column 8 is in tight contact with the end surfaces 6A of the first partition members 6 and with the end surfaces 7A of the second partition members 7.

Specifically, each column 8 has a trapezoidal cross section, with one side extending perpendicular to the two parallel sides, and the remaining side extending at approximately 45 degrees to the longer of the two parallel sides. The above-mentioned remaining side defines the contact surface 8A.

The opposite end surfaces 6A of each first partition member 6, as seen in the stacking direction of the cell assembly NC, are inclined at approximately 45 degrees to a side surface of the partition member 6 facing inwardly of the cell assembly NC. Similarly, the opposite end surfaces 7A of each second partition member 7 are inclined at approximately 45 degrees to a side surface of the partition member 7 facing inwardly of the cell assembly NC. Each of the second partition members 7, in particular, has a thickness substantially corresponding, in the stacking direction, to a thickness of each cell C.

In forming the cell assembly NC, the four columns 8 are first placed in positions corresponding to the four corners of the cell assembly NC. At this time, each contact surface 8A is placed so as to extend at approximately 45 degrees to each of the two sides of the cell assembly NC continuous with the corner opposed to the contact surface 8A.

Next, each of the first partition members 6 is moved in a direction outwardly of the cell assembly NC and substantially perpendicular to the stacking direction, to press the opposite end surfaces 6A thereof against the contact surfaces 8A of two of the columns 8. In this way, the first partition members 6 are arranged in a substantially parallel pair.

Subsequently, each of the second partition members 7 is moved in a direction outwardly of the cell assembly NC and substantially perpendicular to the stacking direction, to press the opposite end surfaces 7A thereof against the contact surfaces 8A of two of the columns 8. In this way, the second partition members 7 are arranged in a substantially parallel pair, and on the pair of first partition members 6 already arranged in place, thereby forming a parallel cross therewith.

Then, one cell C is placed so that the sides thereof defining the openings of the intracellular passages p1 rest tight on the first partition members 6, respectively. The sides of the cell C not defining the openings of the intracellular passages p1 are flanked by the second partition members 7, respectively.

Subsequently, a next pair of first partition members 6 is placed on the cell C in the manner described above. Similarly, a next pair of second partition members 7 is placed to form a parallel cross with the first partition members 6. A further cell C is placed between the second partition members 7. These steps are repeated to stack a plurality of cells C one over another, thereby forming the cell assembly NC.

It is to be noted that a space is formed between each side of each cell C not defining the openings of the intracellular passages p1 and the surface of each second partition member 7 opposed thereto. A seal 9 is fitted in an end region of this space (the end region adjacent the side of the cell C defining the oxygen-containing gas inlets "si" of the intracellular passages p1) to maintain this space in gastight condition. The sides of each cell C defining the openings of the intracellular passages p1 are in tight contact with the first partition members 6 arranged above and below the cell C.

Consequently, an intercellular passage p2 is formed between a vertically adjacent pair of cells C, which is partitioned from the intracellular passages p1. That is, the intercellular passage p2 has opposite sides defined by the first partition members 6, and a top and bottom defined by the two adjacent cells C. The intercellular passage p2 has an opening direction substantially perpendicular to the opening direction of the intracellular passages p1.

The first partition members 6 and second partition members 7 are formed of an insulating and heat resistant material such as ceramic. An insulating and heat resistant adhesive may be used, as necessary, to provide gas-tight connections between the end surfaces 6A of the first partition members 6 and the contact surfaces 8A of the columns 8, between the end surfaces 7A of the second partition members 7 and the contact surfaces 8A of the columns 8, between the first partition members 6 and the sides of the cells C and between the first partition members 6 and second partition members 7.

In this embodiment, the intracellular passages p1 act as oxygen-containing gas passages "s" for receiving an oxygen-containing gas, and the intercellular passages p2 act as fuel gas passages "f" for receiving a fuel gas. The opposite openings of the intracellular passages p1 act as oxygen-containing gas inlets "si" and oxygen-containing gas outlets "so". The opposite openings of the intercellular passages p2 act as fuel gas inlets "fi" and fuel gas outlets "fo".

Each intercellular passage p2 is filled with a fuel-side flexible conductive material 10. The flexible conductive material 10 comprises a felt-like nickel material or other appropriate material having excellent resistance to heat and reduction. This conductive material 10 allows passage of the fuel gas, and absorbs thermal distortions occurring in the direction of width of the cells C.

The construction of the fuel cell system will be described next.

An oxygen-containing gas supply passage Ks and an oxygen-containing gas exhaust passage Hs am provided at the opposite sides of the cell assembly NC having the openings of the oxygen-containing gas passages "s". A fuel gas supply passage Kf and a fuel gas exhaust passage Hf are provided at the opposite sides of the cell assembly NC having the openings of the fuel gas passages "f". These four gas supply passages. Ks and Kf and gas exhaust passages Hs and Hf am defined by gas passage defining members 11.

Each of the gas passage defining members 11 has a box-like configuration including fight and left side walls 11A, upper and lower side walls 11B, a bottom wall 11C and columns 11D.

Each gas passage defining member 11 is disposed to have an opening side thereof opposed to a side of the cell assembly NC, with the right and left side walls 11A connected to, in surface contact with, connecting surfaces 8B or 8C of the columns 8 disposed at opposite lateral ends of one side of the cell assembly NC. That is, the connecting surfaces 8B and 8C are formed planar to achieve tight contact with the gas passage defining members 11.

Figure 5:
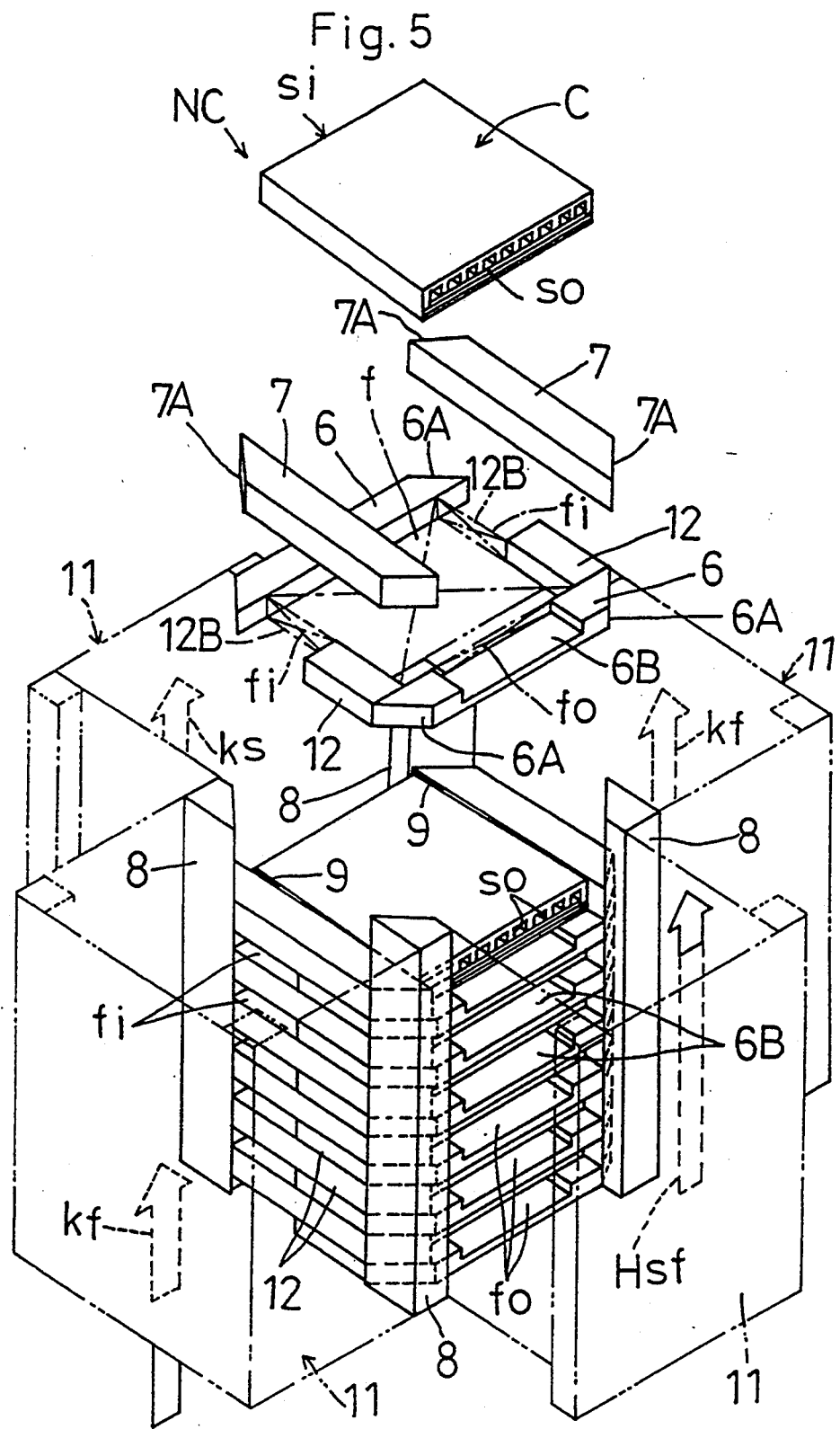
FIG. 5 is an exploded perspective view of a fuel cell system in a second embodiment of the invention.
Figure 6:
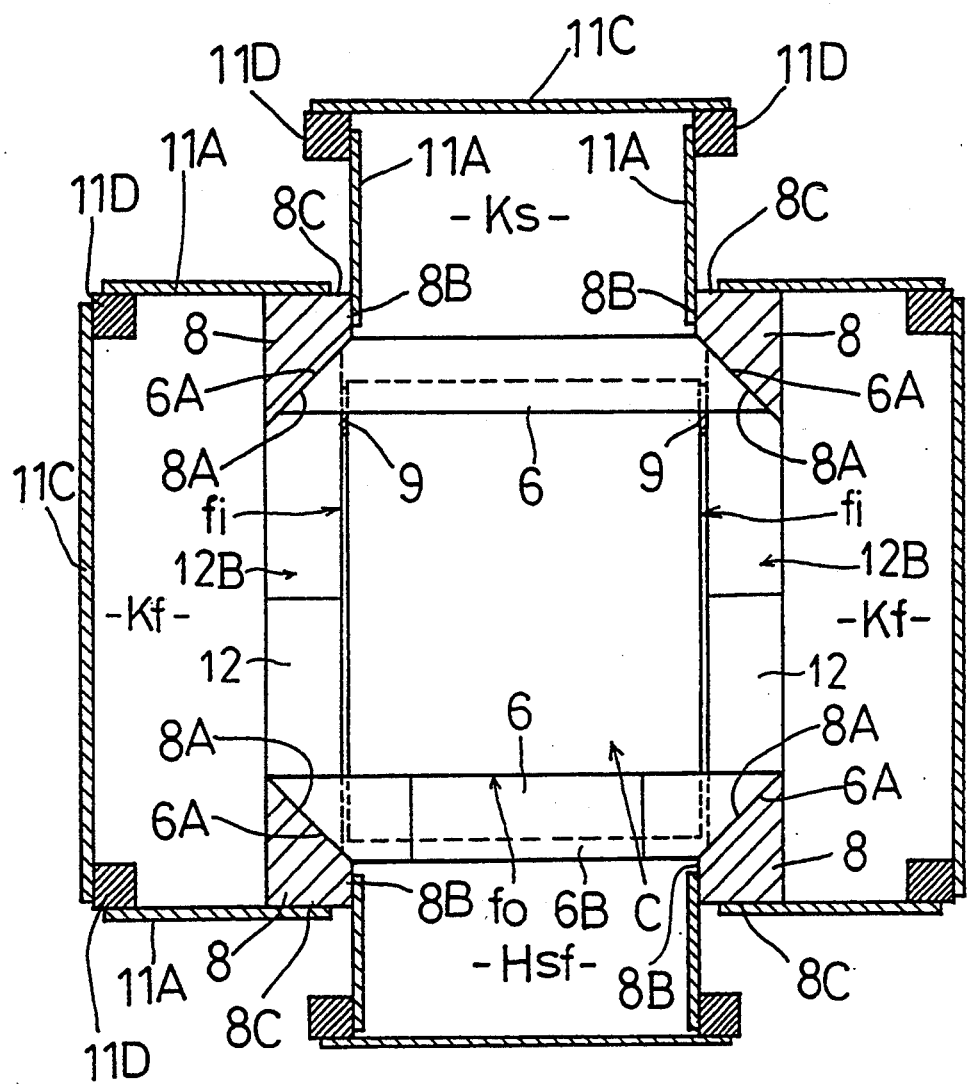
FIG. 6 is a sectional plan view of the fuel cell system in the second embodiment, showing upper surfaces of first partition members.
Figure 7:
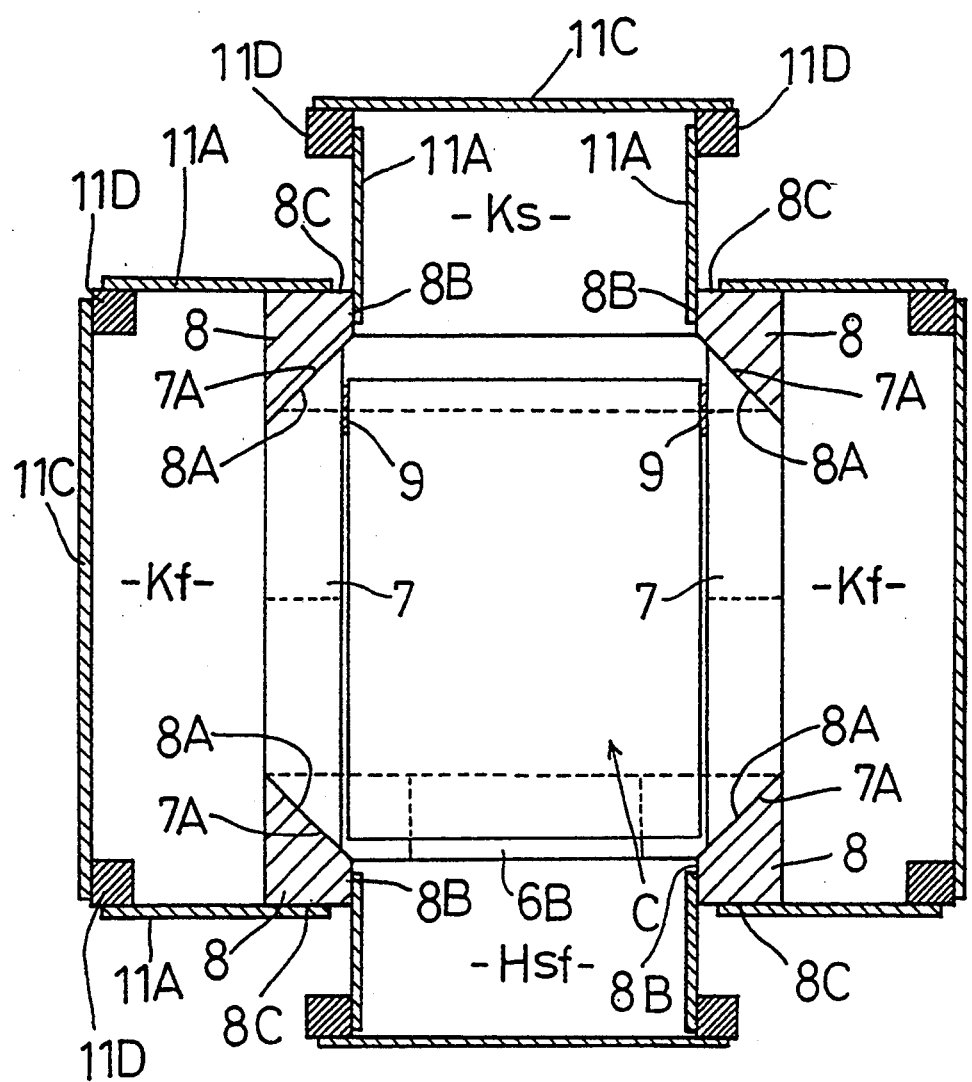
FIG. 7 is a sectional plan view of the fuel cell system in the second embodiment, showing upper surfaces of second partition members.

A second embodiment will be described with reference to FIGS. 5 through 7.

A plurality of cells C prepared as in the first embodiment are stacked as in the first embodiment to form a cell assembly NC.

As distinct from the first embodiment, one of each pair of first partition members 6 defines a recess 6B in this embodiment. This recess 6B provides an opening between this first partition member 6 and cell C. Further, a passage inlet defining member 12 is used to define an opening 12B for each opening of each intercellular passage p2 disposed between a vertically adjacent pair of second partition members 7. The openings 12B are arranged vertically along the two sides of the cell assembly NC, and opposite the openings of the intercellular passages p2 adjacent the oxygen-containing gas inlets "si". In this embodiment also, the intercellular passages p2 act as fuel gas passages "f". All of the openings 12B act as fuel gas inlets "fi", and the openings provided by the recesses 6B act as fuel gas outlets "fo". Thus, the fuel gas outlets "fo" and oxygen-containing gas outlets "so" are arranged along the same side of the cell assembly NC. With this construction, each intercellular passage p2 receives the fuel gas through two fuel gas inlets "fi", and causes the fuel gas to describe curved flow paths to one fuel gas outlet "fo".

An oxygen-containing gas supply passage Ks is provided at the side of the cell assembly NC having the oxygen-containing gas inlets "si". Fuel gas supply passages Kf are provided at the two sides having the fuel gas inlets "fi", respectively. A common gas exhaust passage Hsf is provided at the side of the cell assembly NC having the oxygen-containing gas outlet "so" and fuel gas outlets "fo". These gas supply passages Ks and Kf and gas exhaust passage Hsf are defined by gas passage defining members 11 each disposed to have an opening side thereof opposed to a side of the cell assembly NC. The common gas exhaust passage Hsf acts also as a combustion chamber for burning exhaust oxygen-containing gas and exhaust fuel gas.

Figure 8:
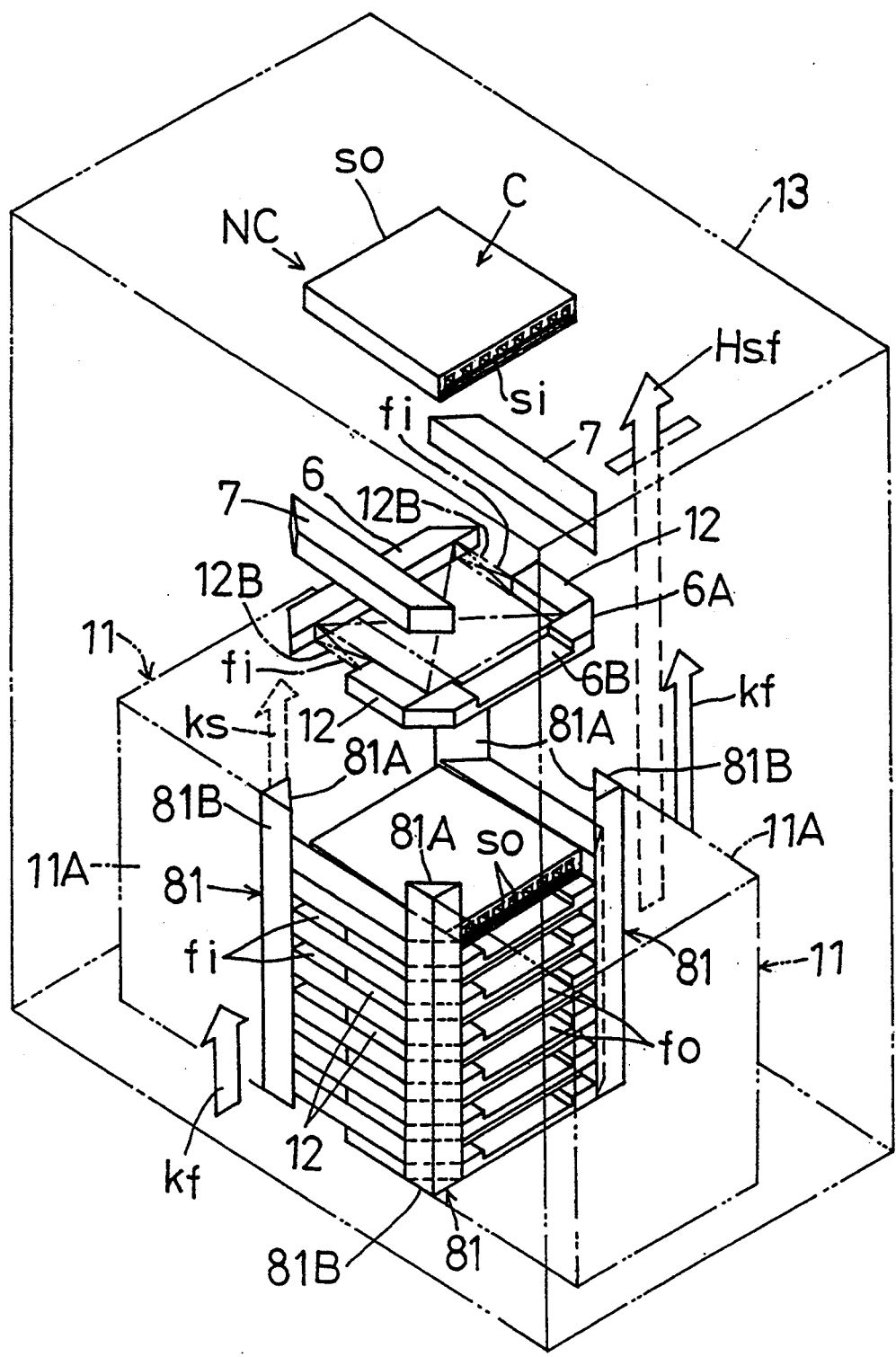
FIG. 8 is an exploded perspective view of a fuel cell system in a third embodiment of the invention.
Figure 9:
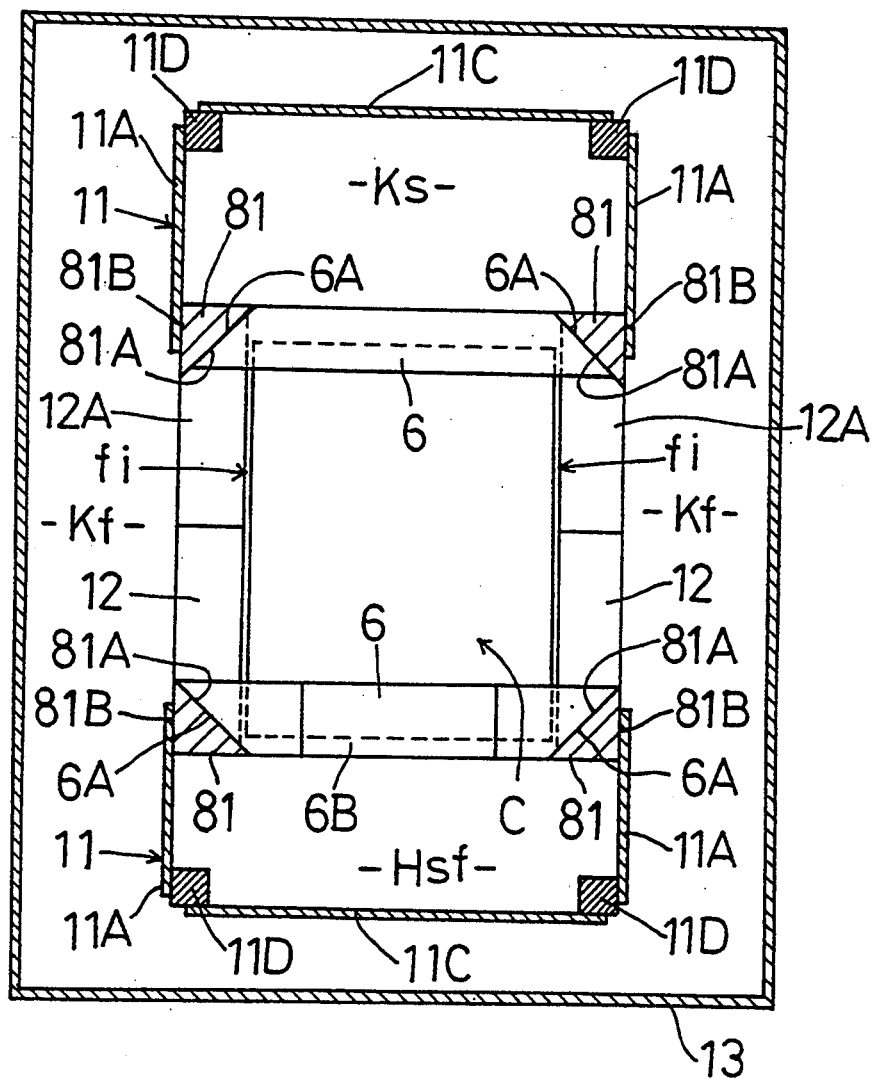
FIG. 9 is a sectional plan view of the fuel cell system in the third embodiment, showing upper surfaces of first partition members.
Figure 10:
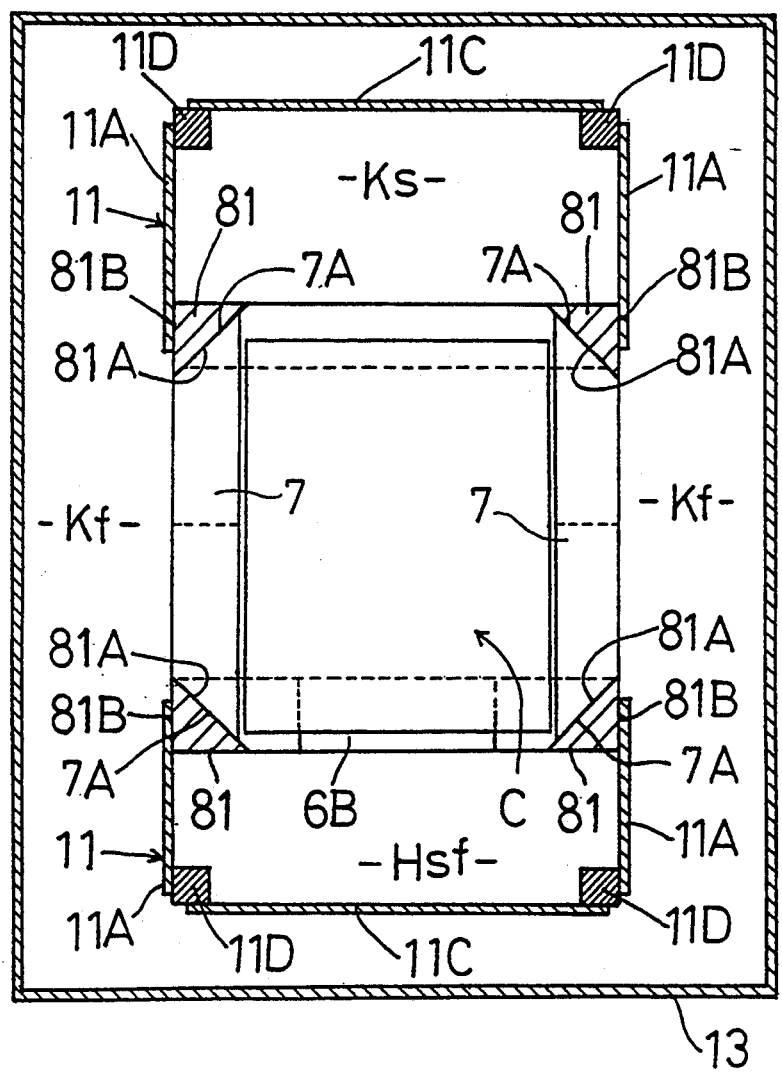
FIG. 10 is a sectional plan view of the fuel cell system in the third embodiment, showing upper surfaces of second partition members.

A third embodiment will be described with reference to FIGS. 8 through 10.

The cell assembly NC in this embodiment has openings 12B and recesses 6B as in the second embodiment. This embodiment differs frown the second embodiment in two respects.

Firstly, this embodiment includes columns 81 each having a cross section in the shape of a right-angled isosceles triangle. Each column 81 has a contact surface 81A extending longitudinally thereof and corresponding to the oblique side of the isosceles triangle. As in the second embodiment, the contact surface 81A lies at approximately 45 degrees to each of the two sides continuous with the corner opposed to the contact surface 81A.

Secondly, the fuel gas supply passages Kf have a different construction to those in the second embodiment. The opposite sides of the cell assembly NC having the fuel gas inlets "fi" are open to the outside. The cell assembly NC, oxygen-containing gas supply passage Ks and common gas exhaust passage Hsf are therefore all enclosed in a box 13. This embodiment is similar to the second embodiment in the other aspects. That is, the oxygen-containing gas supply passage Ks is provided at the side of the cell assembly NC having the oxygen-containing gas inlets "si". The common gas exhaust passage Hsf is provided at the side of the cell assembly NC having the oxygen-containing gas outlets "so" and fuel gas outlets "fo". The fuel gas inlets "fi" are in communication with the interior of the box 13. Thus, the interior of the box 13 acts as a fuel gas supply passage Kf. The common gas exhaust passage Hsf acts also as a combustion chamber for hurrying exhaust oxygen-containing gas and exhaust fuel gas.

Figure 11:
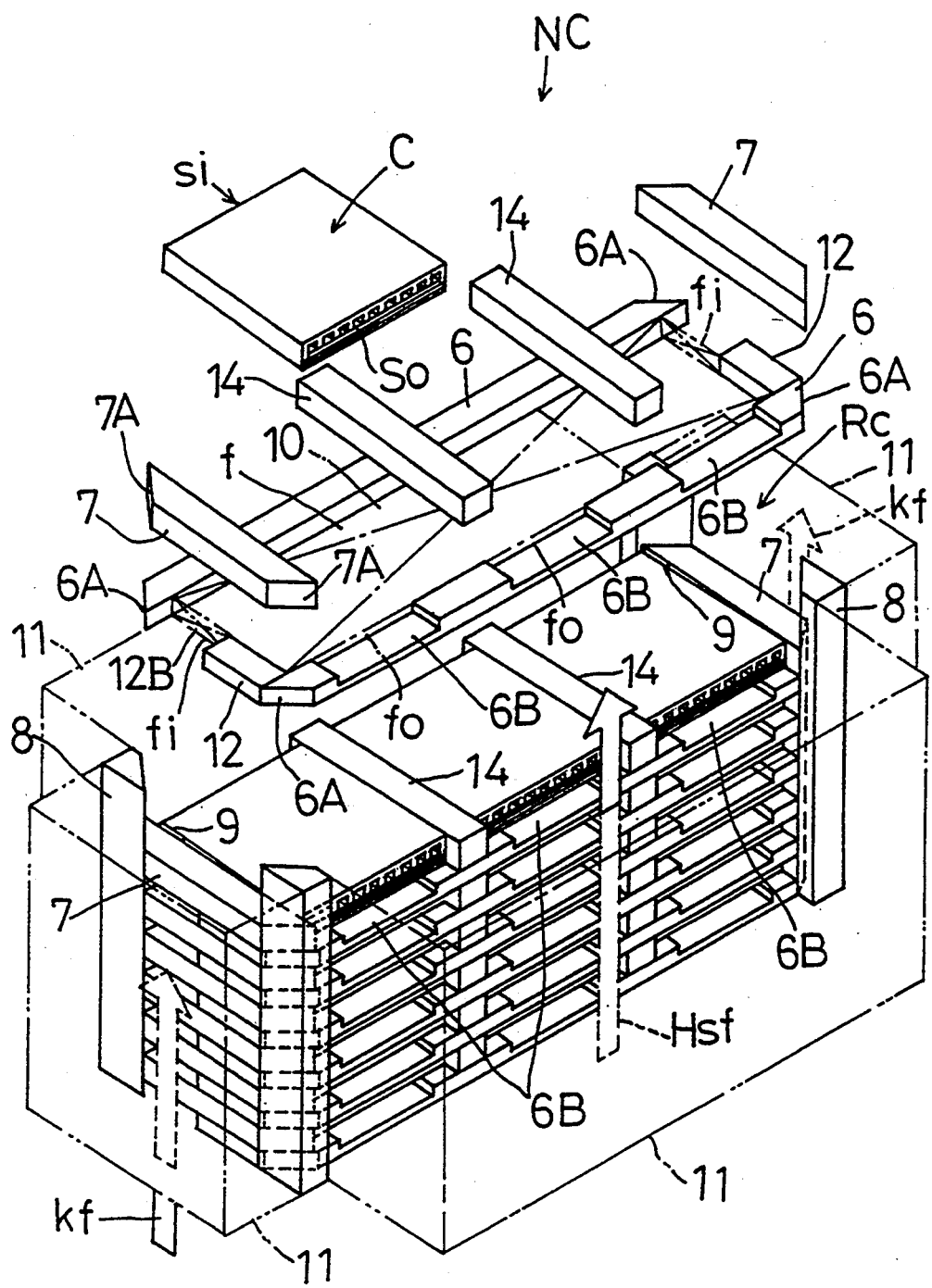
FIG. 11 is an exploded perspective view of a fuel cell system in a fourth embodiment of the invention.
Figure 12:
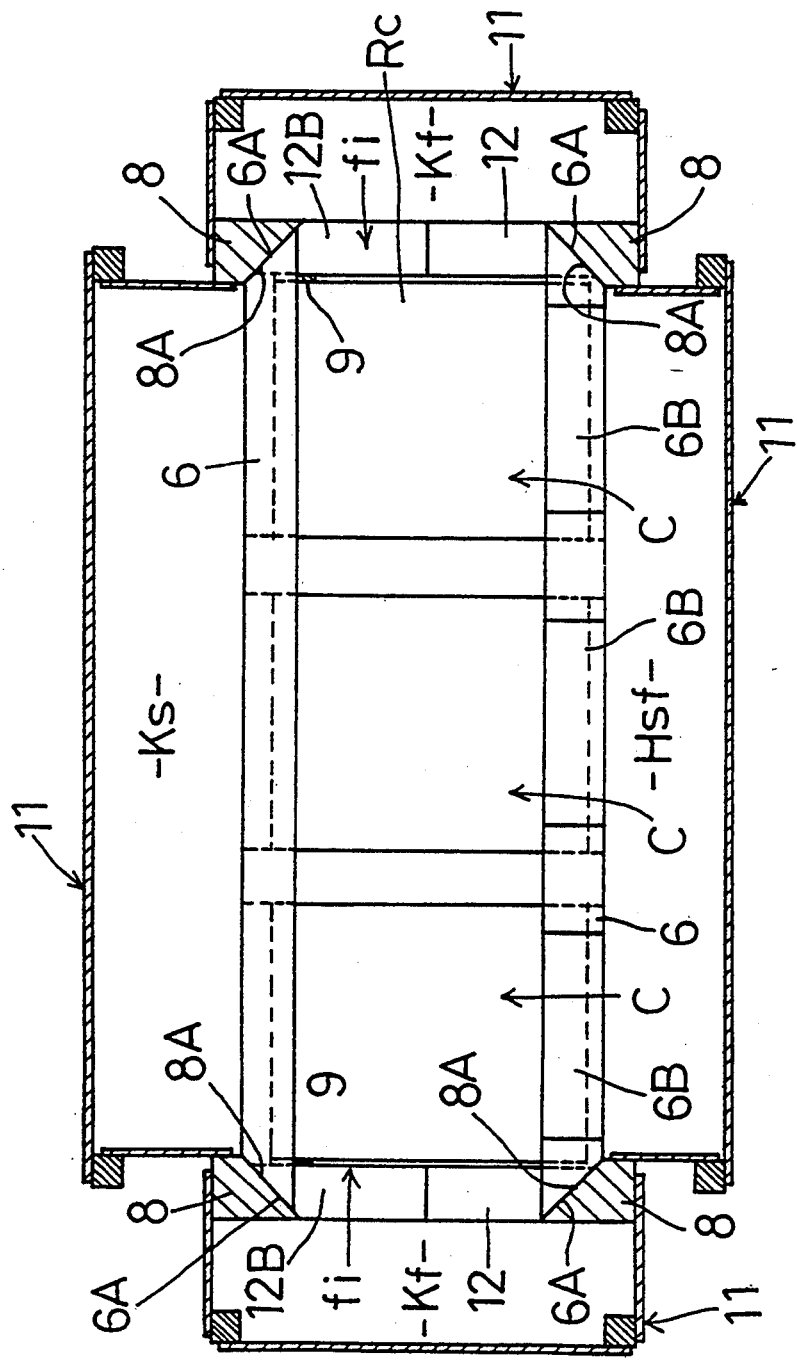
FIG. 12 is a sectional plan view of the fuel cell system in the fourth embodiment, showing upper surfaces of first partition members.
Figure 13:
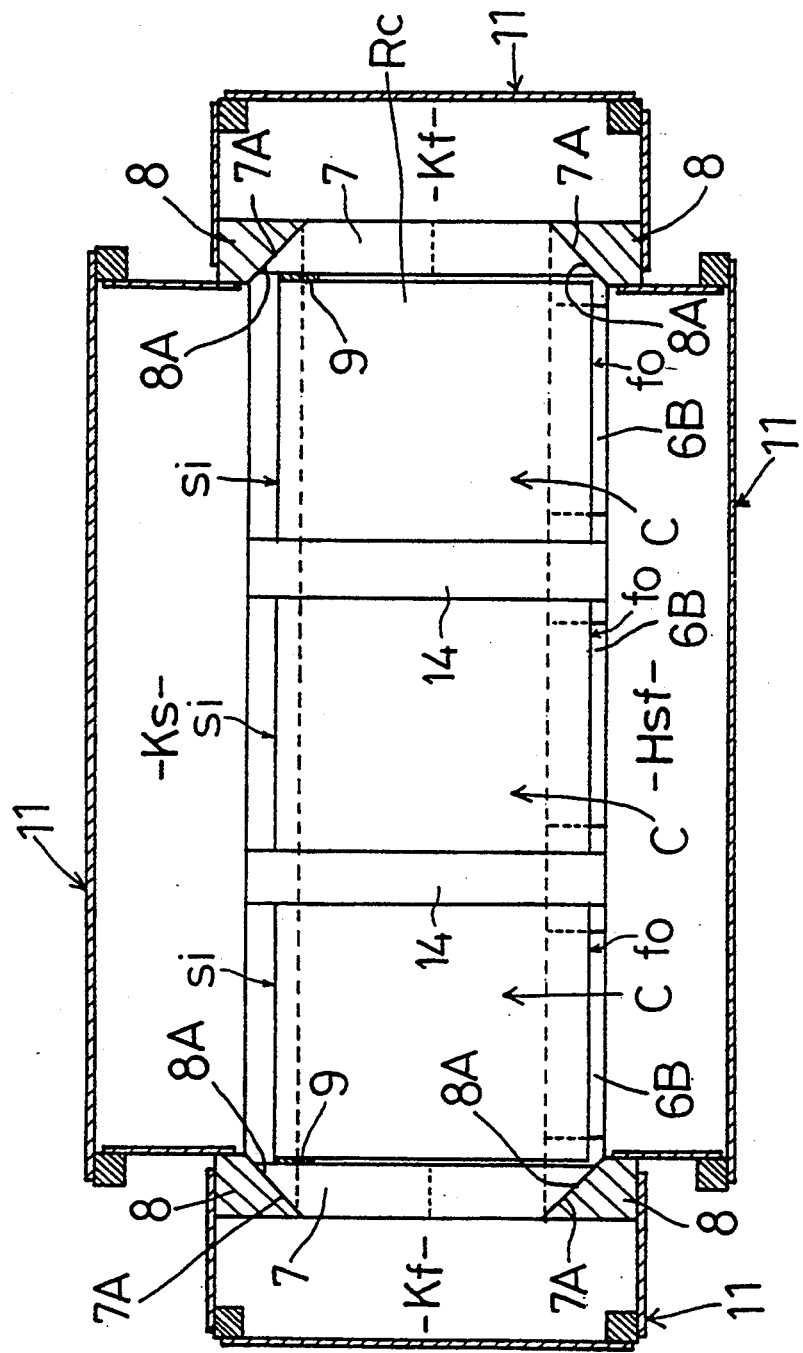
FIG. 13 is a sectional plan view of the fuel cell system in the fourth embodiment, showing upper surfaces of second partition members.

A fourth embodiment will be described with reference to FIGS. 11 through 13.

This embodiment is basically the same as the second embodiment. This embodiment differs from the second embodiment in that a plurality of cells C are arranged side by side to form rows of cells RC.

A row of cells RC includes a plurality of cells C arranged side by side, with a partition member 14 in the form of a square bar interposed between an adjacent pair of cells C. A pair of second partition members 7 extends parallel to the partition members 14 at opposite ends of the row RC. The cells C are placed on a pair of first partition members 6 extending parallel to each other. In this state, the sides of each cell C defining the openings of the intracellular passages p1 and opposite ends of each partition member 14 lie above the pair of first partition members 6. A further pair of first partition members 6 is placed on the row of cells RC, and a further row of cells RC is arranged on these first partition members 6. Thus, a cell assembly NC is formed by stacking rows of cells RC one over another.

Prior to the above process, four columns 8 are erected in positions corresponding to the four corners of the cell assembly NC. Then, a pair of first partition members 6 is placed in tight contact with the columns 8, and a pair of second partition members 7 is placed to form a parallel cross with the first partition members 6. The process thus far is the same as in the second embodiment.

Subsequently, a row of cells RC is placed so that the sides of each cell C defining the openings of the intracellular passages p1 and the opposite ends of each partition member 14 rest tight on the pair of first partition members 6, respectively. A next pair of first partition members 6 is placed on the row of cells RC in the manner described above. Similarly, a next pair of second partition members 7 is placed to form a parallel cross with the first partition members 6. A further row of cells RC is placed between the second partition members 7. These steps are repeated to stack a plurality of rows of cells RC one over another, thereby forming the cell assembly NC.

One of each pair of first partition members 6 defines a plurality of recesses 6B. Each of these recesses 6B provides an opening between this first partition member 6 and cell C. Further, a passage inlet defining member 12 is used to define an opening 12B for each opening of each intercellular passage p2 disposed between a vertically adjacent pair of second partition members 7. The openings 12B are arranged vertically along the two sides of the cell assembly NC, and opposite the openings of the intercellular passages p2 adjacent the oxygen-containing gas inlets "si".

In this embodiment also, the intercellular passages p2 act as fuel gas passages "f". Each of the openings 12B acts as fuel gas inlet "fi", and the openings provided by the recesses 6B act as fuel gas outlets "fo". Thus, juxtaposed fuel gas outlets "fo" and juxtaposed oxygen-containing gas outlets "so" are arranged at the same side of the cell assembly NC. With this construction, each intercellular passage p2 receives the fuel gas through two fuel gas inlets "fi", and causes the fuel gas to describe curved flow paths to the fuel gas outlets "fo".

Figure 14:
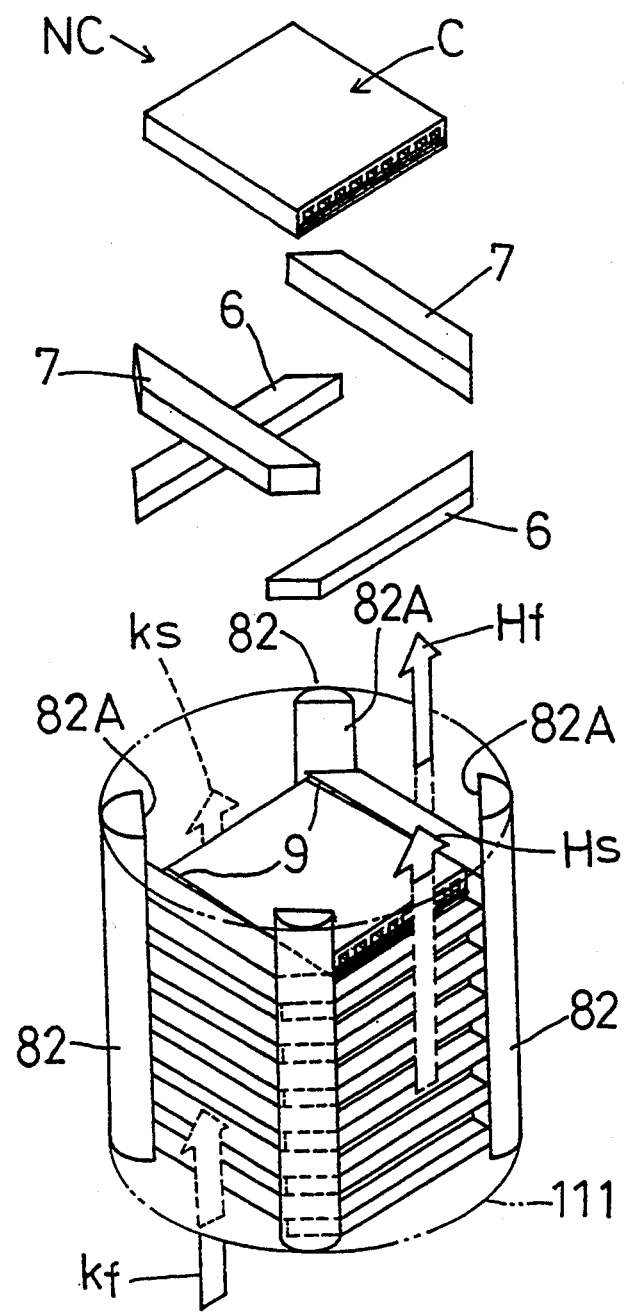
FIG. 14 is an exploded perspective view of a fuel cell system in a fifth embodiment of the invention.
Figure 15:
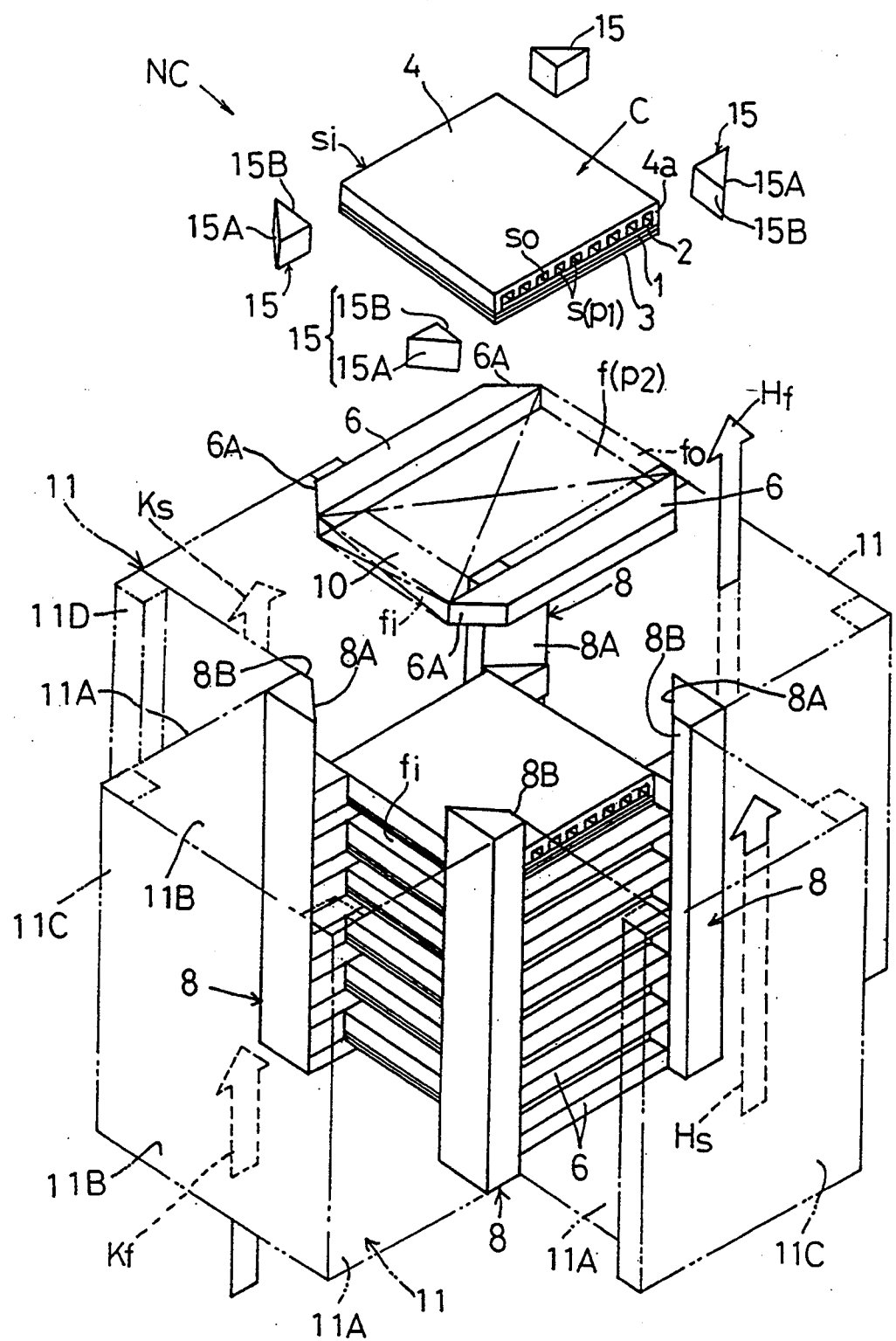
FIG. 15 is an exploded perspective view of a fuel cell system in a sixth embodiment of the invention.
Figure 16:
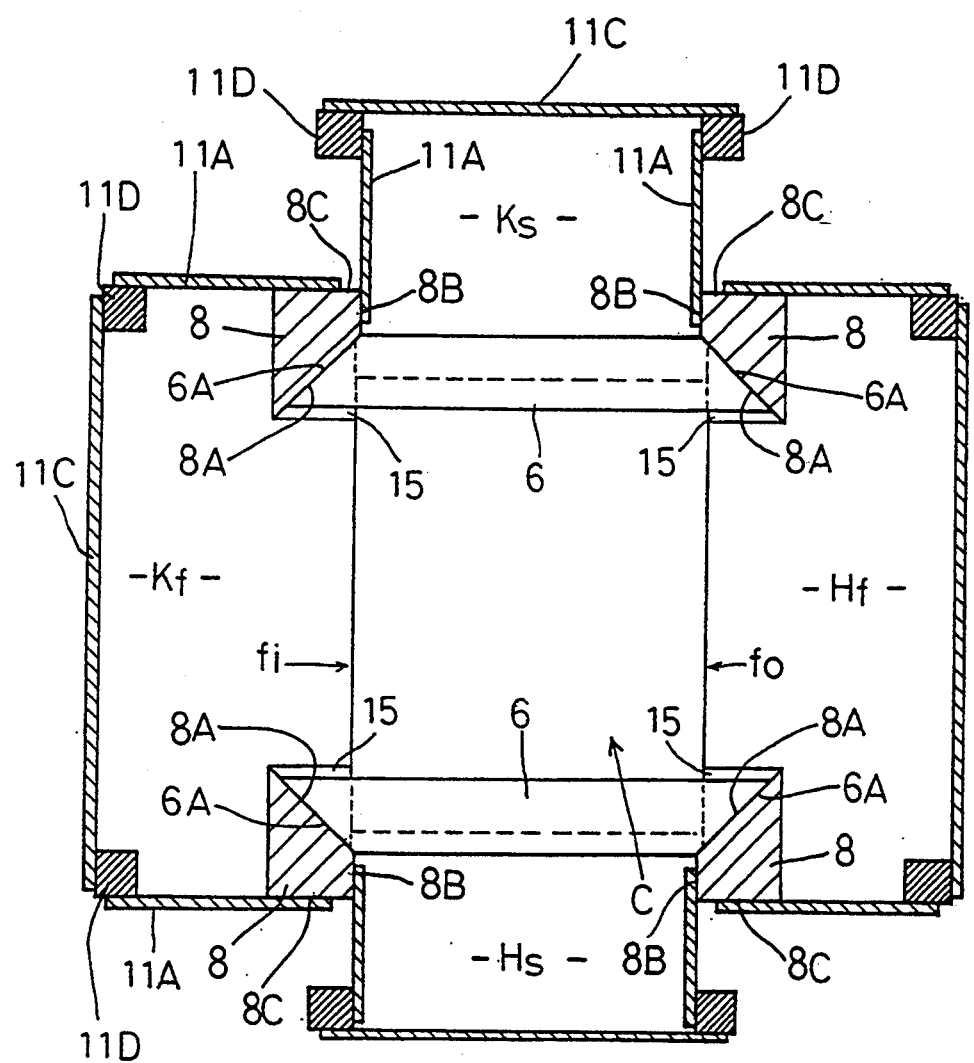
FIG. 16 is a sectional plan view of the fuel cell system in the sixth embodiment, showing upper surfaces of partition members.
Figure 17:
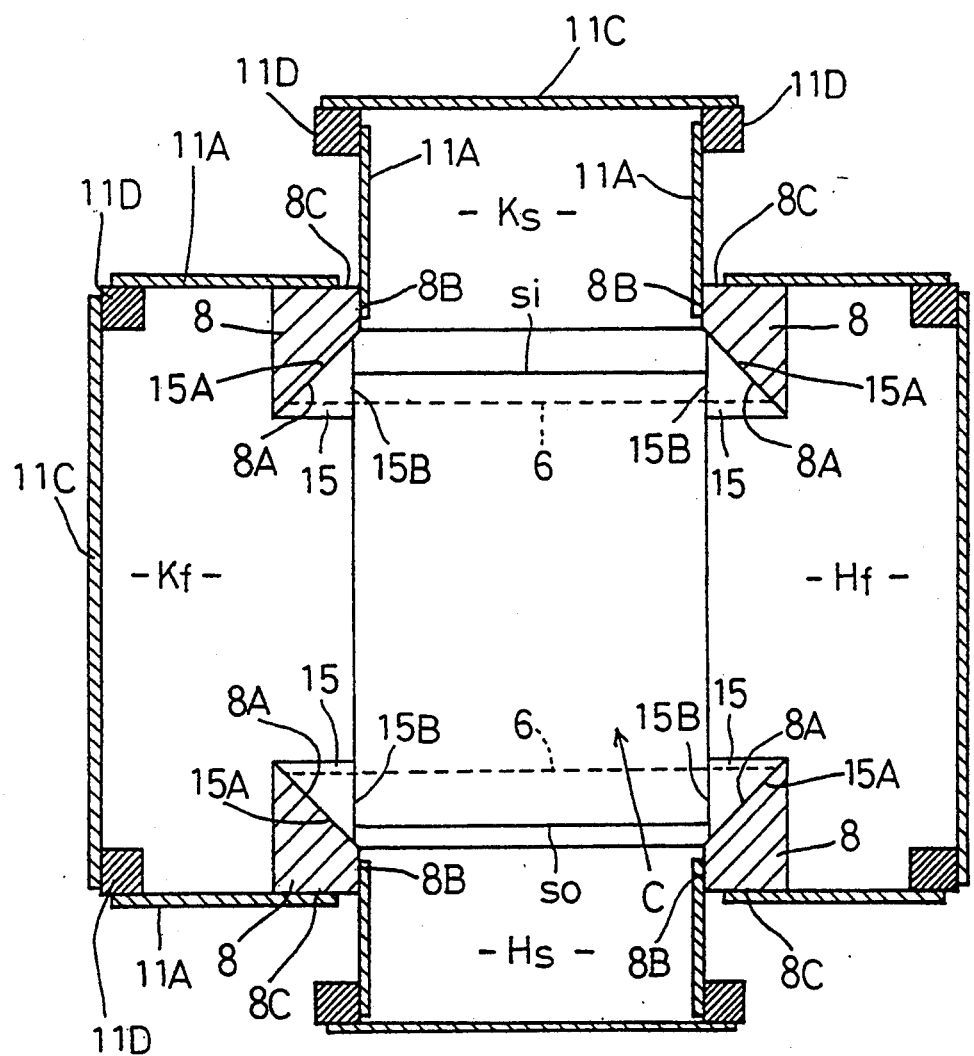
FIG. 17 is a sectional plan view of the fuel cell system in the sixth embodiment, showing upper surfaces of spacers and a cell.
Figure 18A:
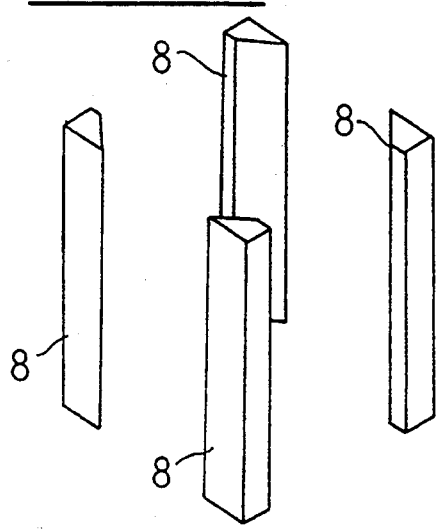
FIG. 18 is a view showing a sequence of constructing the fuel cell system in the sixth embodiment.
Figure 18B:
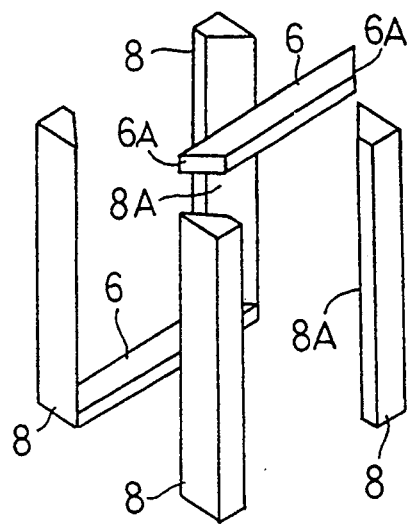
Figure 18C:
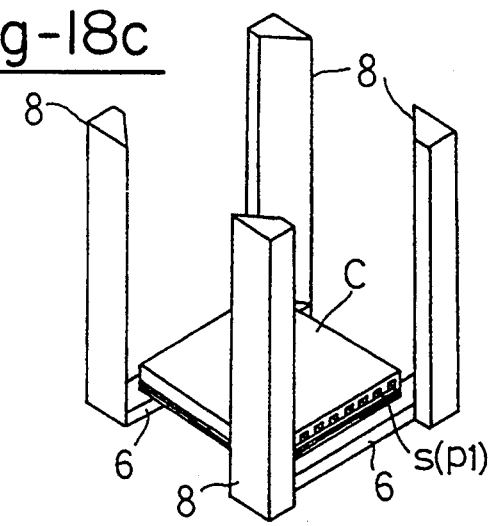
Figure 18D:
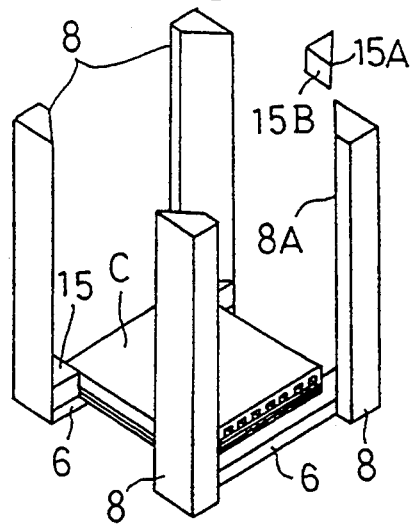
Figure 18E:
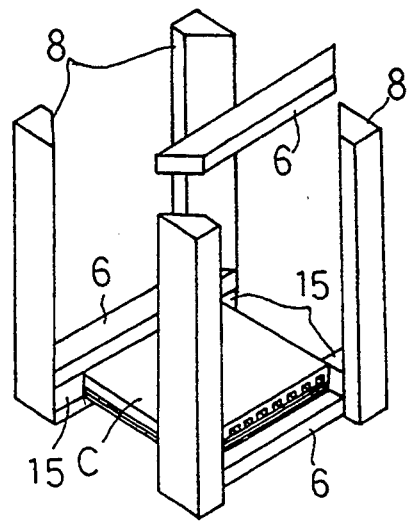

FIG. 14 shows a fifth embodiment.

This embodiment includes columns 82 each having a cross section in the shape of a segment of a circle. Each column 82 has a planar contact surface 82A corresponding to the chord of the segment. A cylindrical gas passage defining member 111 is disposed with inner peripheral surfaces thereof in tight contact with outer peripheral surfaces of the four columns 82. Four spaces are defined by inner peripheral surfaces of the cylindrical gas passage defining member 111 and side surfaces of the cell assembly NC. These spaces act as an oxygen-containing gas supply passage Ks, a fuel gas supply passage Kf, an oxygen-containing gas exhaust passage Hs and a fuel gas exhaust passage Hf, respectively.

FIGS. 15 through 18 show a sixth embodiment.

Reference NC denotes a cell assembly including a plurality of cells C in the form of rectangular plates stacked one over another to define fuel gas passages "f" in between.

This embodiment employs a pair of first opposed elongate partition members 6 in the form of square bars and four spacers 15 for each cell C. Each of the first partition members 6 has opposite end surfaces 6A which, as seen in the stacking direction of the cell assembly NC, are inclined at approximately 45 degrees to a side surface of the partition member 6 facing inwardly of the cell assembly NC. Each of the spacers 15 is substantially in the shape of a right-angled isosceles triangle as seen in the stacking direction, with an angle of 45 degrees formed at each end of the oblique side of the triangle. Each spacer 15 has a first tight contact surface 15A corresponding to the oblique side, and second tight contact surfaces 15B corresponding to the remaining sides. Each spacer 15 substantially corresponds in thickness to each cell C.

Each cell C is placed on one pair of first partition members 6 extending parallel to each other. In this state, the sides of the cell C defining openings of intracellular passages p1 lie above the pair of first partition members 6. Then, each of the four spacers 15 is placed at an end of a side of the cell C not having the openings of the intracellular passages p1 and adjacent the openings of the intracellular passages p1. That is, the four spacers 15 are placed in contact with the sides of the cell C not having the openings of the intracellular passages p1 so as to hold the cell C in place, and on the pair of first partition members 6 already arranged in place.

A column 8 is erected along each of the four corners of the cell assembly NC. Each column 8 has a trapezoidal cross section, with one side extending perpendicular to the two parallel sides, and the remaining side extending at approximately 45 degrees to the longer of the two parallel sides. The above-mentioned remaining side defines a contact surface 8A extending longitudinally of the column 8. The contact surface 8A, as seen in the stacking direction of the cell assembly NC, crosses two sides continuous with the corner of the cell assembly NC opposed to the contact surface 8A.

When the cell assembly NC has been formed, the contact surface 8A of each column 8 is in tight contact with the end surfaces 6A of the first partition members 6 and with the first tight contact surfaces 15A of the spacers 15. Further, the second tight contact surfaces 15B of the spacers 15 are in tight contact with the sides of the cells C not having the openings of the intracellular passages p1.

FIG. 18 shows a specific sequence of constructing the cell assembly NC.

The four columns 8 are first placed in positions corresponding to the four corners of the cell assembly NC. At this time, each contact surface 8A is placed so as to extend at approximately 45 degrees to each of the two sides continuous with the corner opposed to the contact surface 8A.

Next, each of the first partition members 6 is moved in a direction outwardly of the cell assembly NC and substantially perpendicular to the stacking direction, to press the opposite end surfaces 6A thereof against the contact surfaces 8A of two of the columns 8. In this way, the first partition members 6 are arranged in a substantially parallel pair.

Then, one cell C is placed so that the sides thereof defining the openings of the intracellular passages p1 rest tight on the first partition members 6, respectively. Four gaps are formed between the contact surfaces 8A of the columns 8 and the sides of the cell C not defining the openings of the intracellular passages p1. The spacers 15 are arranged in these spaces. At this time, each spacer 15 has a bottom surface in tight contact with an upper surface of an end region of one of the first partition members 6. The first tight contact surface 15A of each spacer 15 is in tight contact with the contact surface 8A of one of the columns 8. One of the second tight contact surfaces 15B of each spacer 15 is in tight contact with one side of the cell C.

A next pair of first partition members 6 is placed on the cell C and spacers 15 already placed in position. This pair of first partition members 6 is placed so that the sides of the cell C having the openings of the intracellular passages p1 are in tight contact with lower surfaces of the first partition members 6. A further cell C and further four spacers 15 are placed on the new pair of first partition members 6. These steps are repeated to stack a plurality of cells C one over another, thereby forming the cell assembly NC.

The first partition members 6 and spacers 15 are formed of an insulating and heat resistant material such as ceramic. An insulating and heat resistant adhesive may be used, as necessary, to provide gastight connections between the end surfaces 6A of the first partition members 6 and the contact surfaces 8A of the columns 8, between the first partition members 6 and the sides of the cells C, between the first partition members 6 and spacers 15, between the first tight contact surfaces 15A and the contact surfaces 8A of the columns 8 and between the second tight contact surfaces 15B and the sides of the cells C.

In the above construction, an intercellular passage p2 is formed between a vertically adjacent pair of cells C, which is partitioned from the intracellular passages p1. That is, the intercellular passage p2 has opposite sides defined by the first partition members 6, and a top and bottom defined by the two adjacent cells C. The intercellular passage p2 has an opening direction substantially perpendicular to the opening direction of the intracellular passages p1.

In this embodiment, the intracellular passages p1 act as oxygen-containing gas passages "s" for receiving an oxygen-containing gas, and the intercellular passages p2 act as fuel gas passages "f" for receiving a fuel gas. The opposite openings of the intracellular passages p1 act as oxygen-containing gas inlets "si" and oxygen-containing gas outlets "so". The opposite openings of the intercellular passages p2 act as fuel gas inlets "fi" and fuel gas outlets "fo".

Each intercellular passage p2 is filled with a fuel-side flexible conductive material 10. The flexible conductive material 10 comprises a felt-like nickel material or other appropriate material having excellent resistance to heat and reduction. This conductive material 10 allows passage of the fuel gas, and absorbs thermal distortions occurring in the direction of width of the cells C.

An oxygen-containing gas supply passage Ks and an oxygen-containing gas exhaust passage Hs are provided at the opposite sides of the cell assembly NC having the openings of the oxygen-containing gas passage "s". A fuel gas supply passage Kf and fuel gas exhaust passage Hf are provided at the opposite sides of the cell assembly NC having the openings of the fuel gas passages "f". These four gas supply passages Ks and Kf and gas exhaust passages Hs and Hf are defined by gas passage defining members 11.

Each of the gas passage defining members 11 has a box-like configuration including right and left side walls 11A, upper and lower side walls 11B, a bottom wall 11C and columns 11D.

Each gas passage defining member 11 is disposed to have an opening side thereof opposed to a side of the cell assembly NC, with the right and left side walls 11A connected to, in surface contact with, connecting surfaces 8B or 8C of the columns 8 disposed at opposite lateral ends of one side of the cell assembly NC. That is, the connecting surfaces 8B and 8C are formed planar to achieve tight contact with the gas passage defining members 11.

Figure 19:
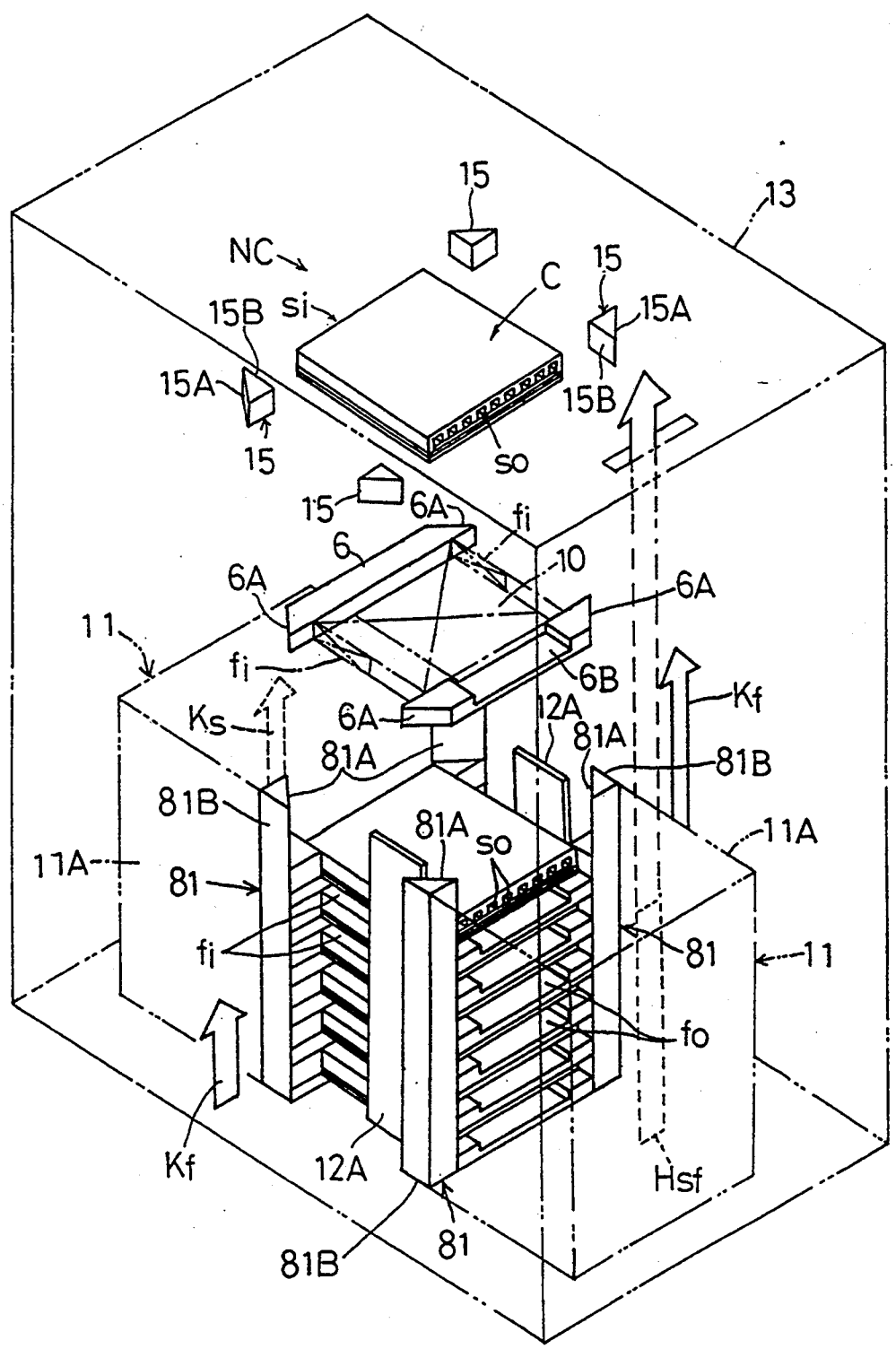
FIG. 19 is an exploded perspective view of a fuel cell system in a seventh embodiment of the invention.
Figure 20:
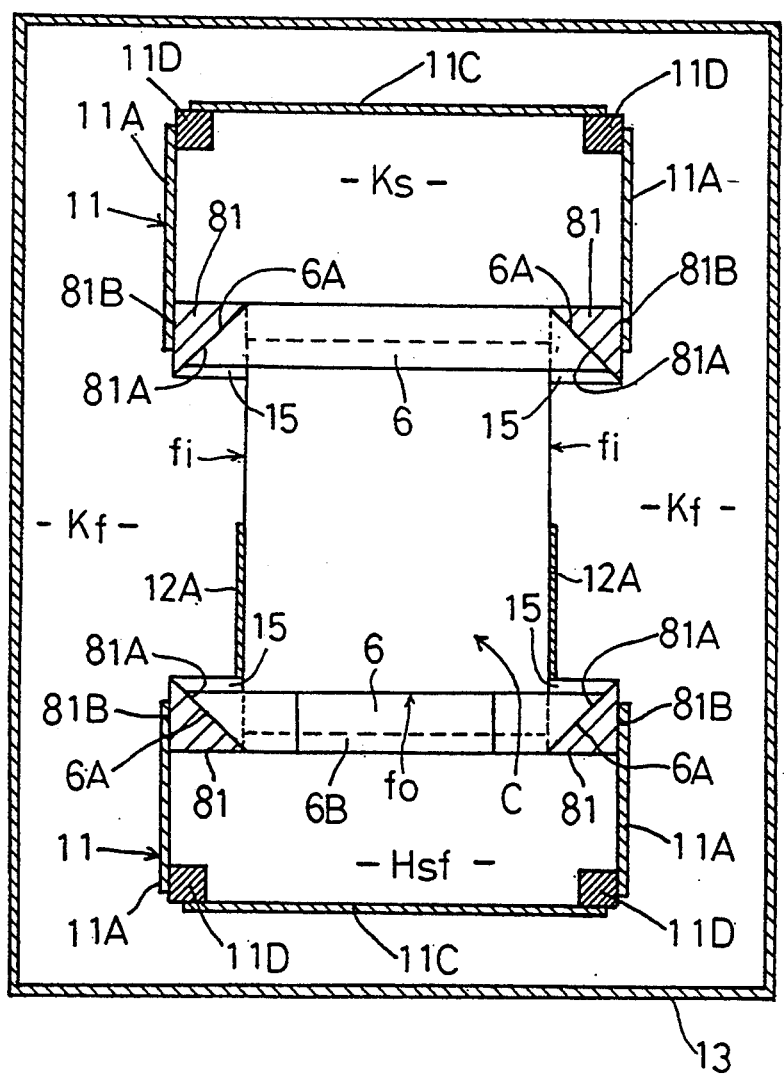
FIG. 20 is a sectional plan view of the fuel cell system in the seventh embodiment, showing upper surfaces of partition members.
Figure 21:
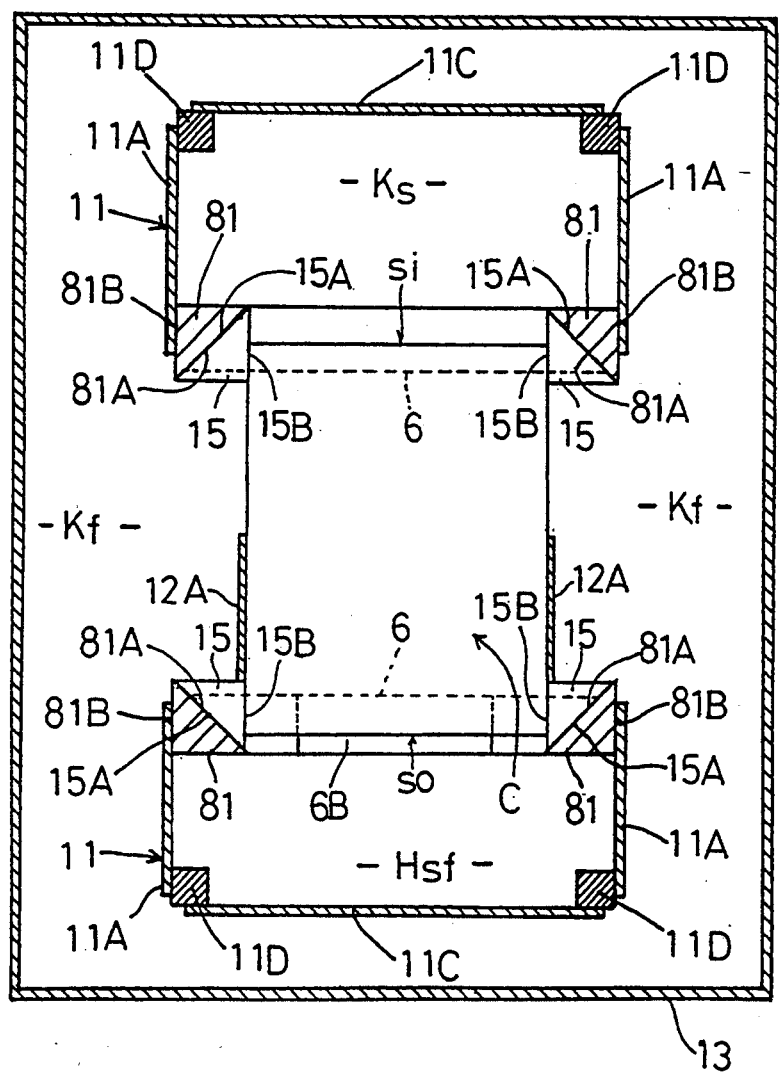
FIG. 21 is a sectional plan view of the fuel cell system in the seventh embodiment, showing upper surfaces of spacers and a cell.

A seventh embodiment will be described with reference to FIGS. 19 through 21.

A plurality of cells C prepared as in the preceding embodiments are stacked as in the sixth embodiment to form a cell assembly NC.

The first partition members 6 used in this embodiment are similar to those in the second and third embodiments. One of each pair of first partition members 6 defines a recess 6B.

A passage inlet defining plate 12A is attached to each of the two sides of the cell assembly NC defined by the sides of the cells C not having the openings of the intracellular passages p1. The passage inlet defining plate 12A is of smaller width than exposed portions of these sides of the cells C, and has an edge in tight contact with end faces of spacers 15 stacked adjacent the oxygen-containing gas outlets "so".

This embodiment includes columns 81 each having a cross section in the shape of a right-angled isosceles triangle. Each column 81 has a contact surface 81A extending longitudinally thereof and corresponding to the oblique side of the isosceles triangle. As in the preceding embodiments, the contact surface 81A lies at approximately 45 degrees to each of the two sides of the cell assembly NC continuous with the corner opposed to the contact surface 81A.

The passage inlet defining plates 12A define a pair of openings of each intercellular passage p2 disposed adjacent the oxygen-containing gas inlets "si". The pair of openings act as fuel gas inlets "fi". The fuel gas passages "f" have fuel gas outlets "fo" communicating with the recesses 6B of the first partition members 6. With this construction, each intercellular passage p2 receives the fuel gas through two fuel gas inlets "fi", and causes the fuel gas to describe curved flow paths to one fuel gas outlet "fo".

The oxygen-containing gas supply passage Ks is provided at the side of the cell assembly NC having the oxygen-containing gas inlets "si". The common gas exhaust passage Hsf is provided at the side of the cell assembly NC having the oxygen-containing gas outlets "so" and fuel gas outlets "fo". Each gas passage defining member 11 is disposed to have right and left side walls 11A thereof connected to, in surface contact with, side surfaces 81B of the columns 81. The opposite sides of the cell assembly NC having the fuel gas inlets "fi" are open to the outside. The cell assembly NC, oxygen-containing gas supply passage Ks and common gas exhaust passage Hsf are therefore all enclosed in a box 13. The fuel gas inlets "fi" are in communication with the interior of the box 13. Thus, the interior of the box 13 acts as fuel gas supply passages Kf. The common gas exhaust passage Hsf acts also as a combustion chamber for burning exhaust oxygen-containing gas and exhaust fuel gas.

Figure 22:
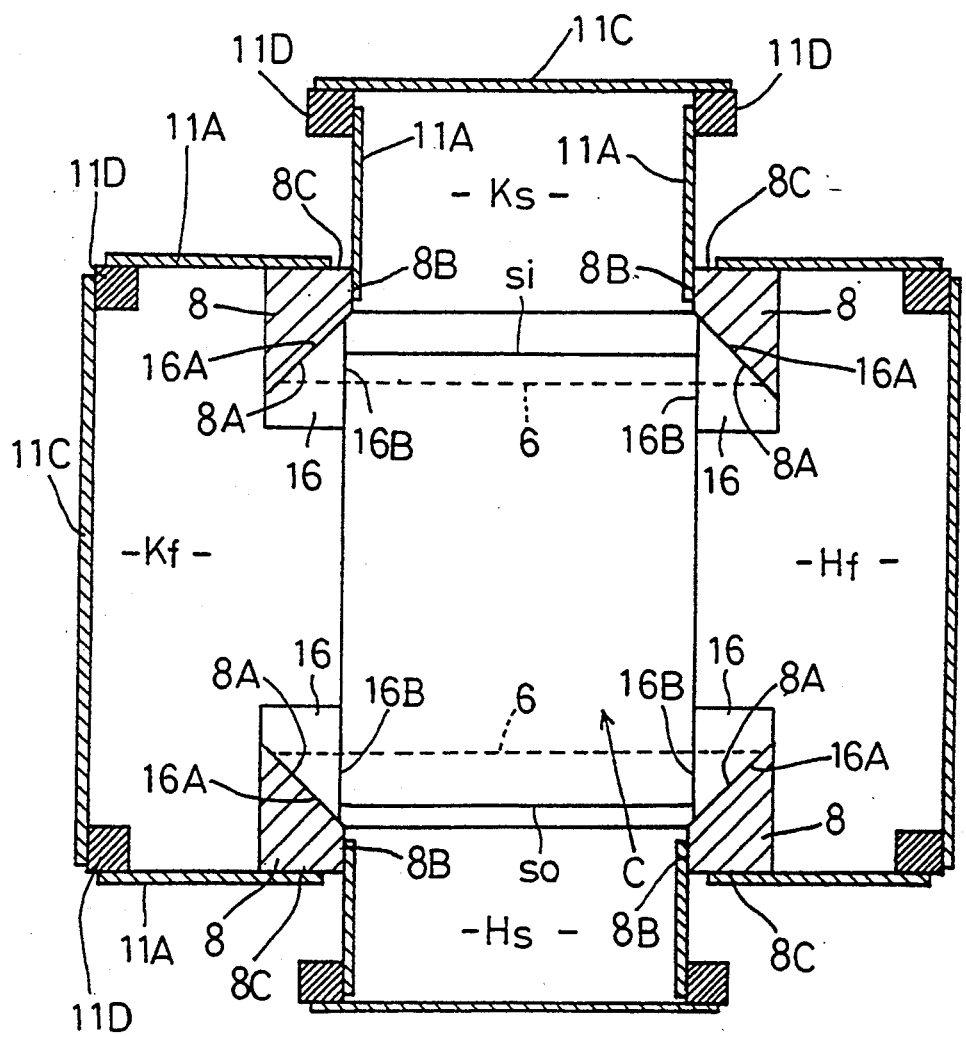
FIG. 22 is a sectional plan view of the fuel cell system in an eighth embodiment of the invention, showing upper surfaces of spacers and a cell.

FIG. 22 shows an eighth embodiment.

The spacers 16 may be varied in shape, e.g. a trapezoidal cross section in the direction perpendicular to the stacking direction.

Figure 23:
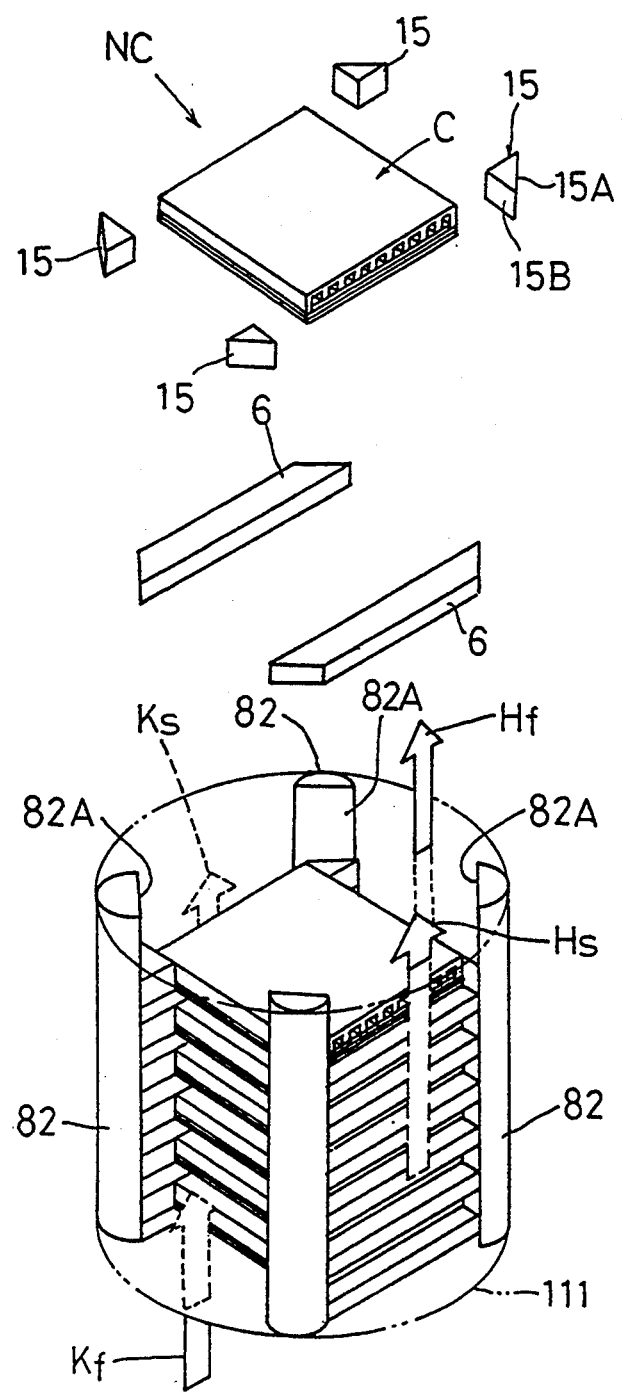
FIG. 23 is an exploded perspective view of a fuel cell system in a ninth embodiment of the invention.

FIG. 23 shows a ninth embodiment.

The columns 82 may be varied in shape. As shown in FIG. 23, each column 82 may have a cross section in the shape of a segment of a circle, and have a planar contact surface 82A corresponding to the chord of the segment.

In this case, a cylindrical gas passage defining member 111 is disposed with inner peripheral surfaces thereof in tight contact with outer peripheral surfaces of the four columns 82. Four spaces are defined by inner peripheral surfaces of the cylindrical gas passage defining member 111 and side surfaces of the cell assembly NC. These spaces act as an oxygen-containing gas supply passage Ks, a fuel gas supply passage Kf, an oxygen-containing gas exhaust passage Hs and a fuel gas exhaust passage Hf, respectively.

Figure 24:
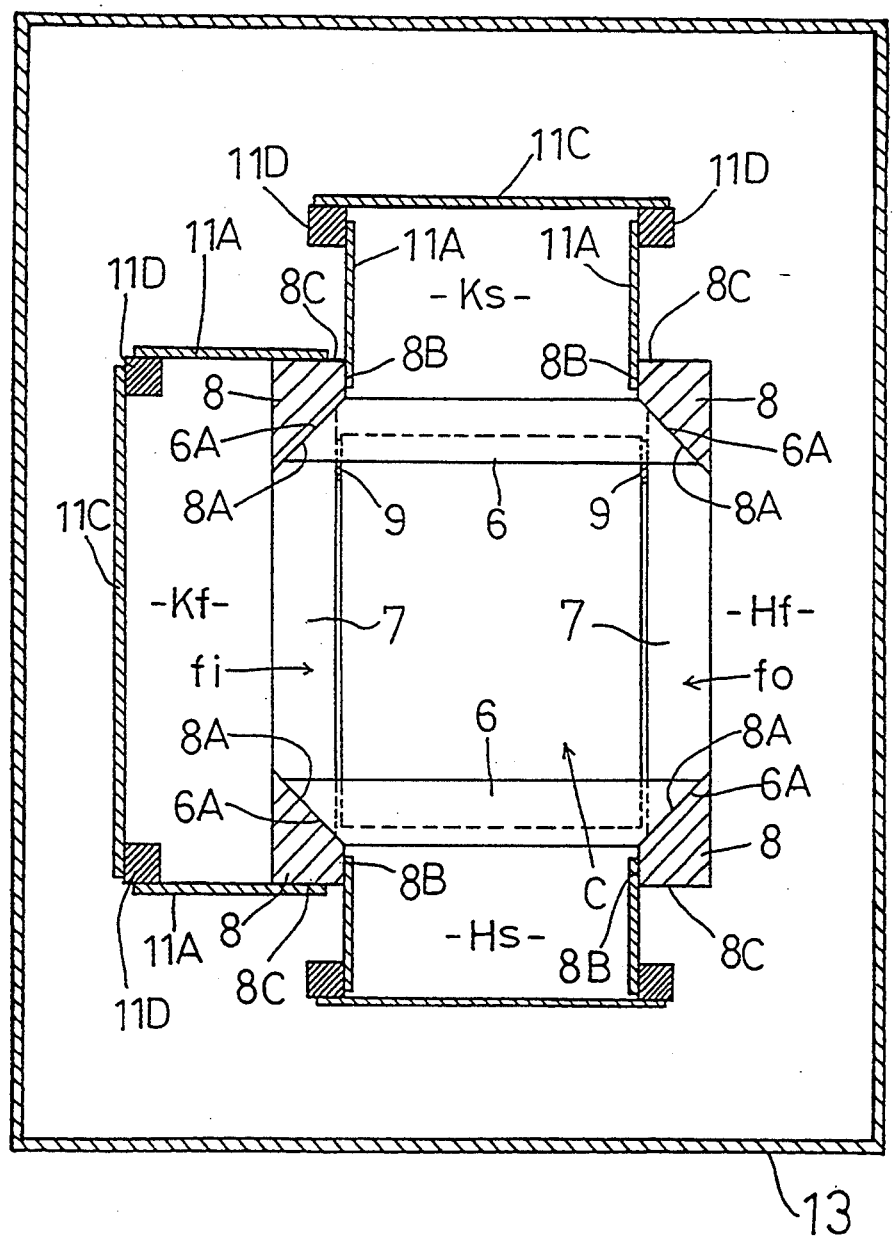
FIG. 24 is a sectional plan view of the fuel cell system in a tenth embodiment, showing upper surfaces of first partition members.
Figure 26:
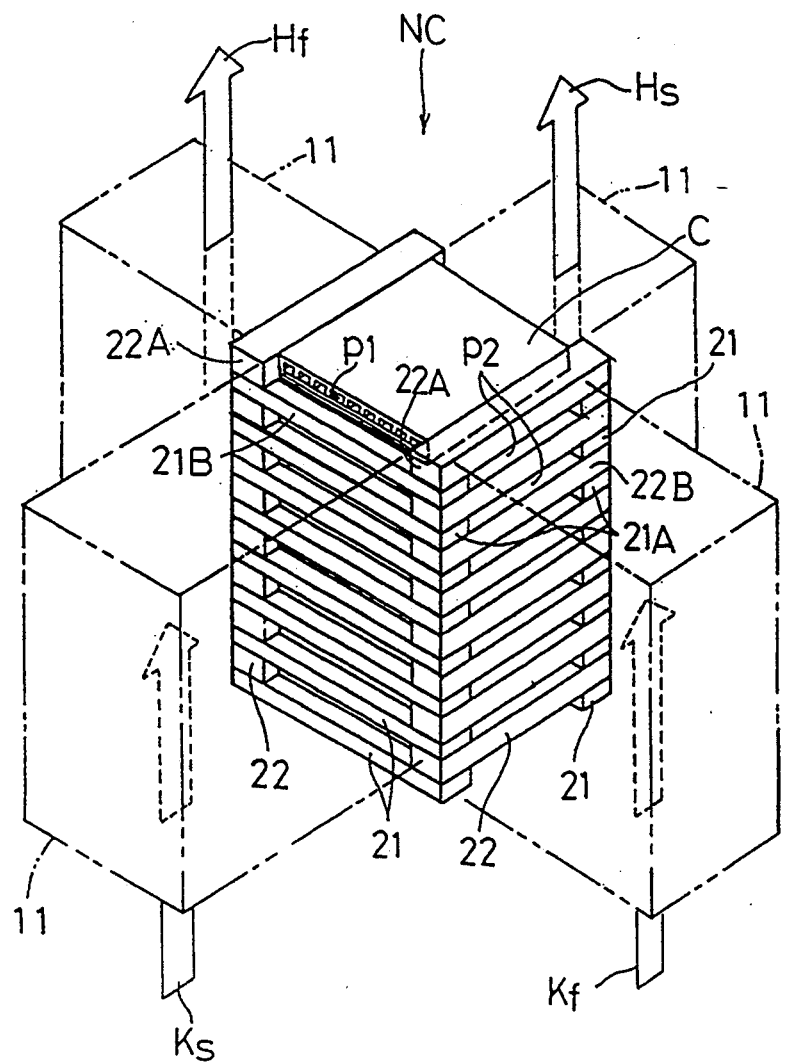
FIG. 26 is a perspective view of a conventional fuel cell system.

FIG. 24 shows a tenth embodiment.

In a fuel cell system having a cell assembly NC enclosed in a box 13, the gas passage defining members 11 or 111 may be modified as follows. For example, a fuel cell system as in the first embodiment but not having either the fuel gas supply passage Kf or fuel gas exhaust passage Hf may be enclosed in the box 13. The tenth embodiment shown in FIG. 24 does not include the gas passage defining member 11 defining a fuel gas exhaust passage Hf, but instead the interior of the box 13 acts as a fuel gas exhaust passage Hf. Conversely, though not illustrated, the gas passage defining member 11 defining a gas exhaust passage Hf may be provided, with the interior of the box 13 acting as a fuel gas supply passage Kf. Further, the fuel cell system in the fifth embodiment may be modified to eliminate the portion of the gas passage defining member 111 defining the fuel gas supply passage Kf or fuel gas exhaust passage Hf, and may be enclosed in a box 13. In the tenth embodiment and similar modification, the components used as the second partition members may be in the form of elongate bars 7 as in the first embodiment or may be spacers 15 or 16 as in the sixth or eighth embodiment.

FIG. 25 shows an eleventh embodiment.

This embodiment includes a water-cooled jacket 23 mounted in an intercellular passage p2 to act as means to prevent a temperature increase of the cells C.

Each intercellular passage p2 is filled with a fuel-side flexible conductive material 10. The flexible conductive material 10 comprises a felt-like nickel material or other appropriate material having excellent resistance to heat and reduction. This conductive material 10 allows passage of the fuel gas, and absorbs thermal distortions occurring in the direction of width of the cells C.

The water-cooled jacket 23 is mounted in the flexible conductive material 10. This maintains the cells C in a predetermined temperature range, and prevents damage done to the cells C due to excessive temperature variations. The water-cooled jacket 23 may be formed of a freely selected material such as a material having excellent heat conduction.

The number and shape of water-cooled jackets 23 in one intercellular passage p2 may be selected as desired. Such water-cooled jackets 23 may be mounted in all intercellular passages p2 or selected intercellular passages p2.

Other embodiments will be set out hereunder though not depicted:

1) In the foregoing embodiments, the contact surface 8A, 81A or 82A of each column 8, 81 or 82, as seen in the stacking direction of the cell assembly NC, extends at an angle of approximately 45 degrees to each of the two sides of the cell assembly NC continuous with the column 8, 81 or 82. This provides the advantage of facilitating manufacture of components since the end surfaces 6A of the first partition members 6, the end surfaces 7A of the second partition members 7, and the first tight contact surfaces 15A or 16A of the spacers 15 or 16, may all be formed with an inclination of approximately 45 degrees.

However, the contact surface 8A, 81A or 82A may extend at a varied angle to each of the two sides of the cell assembly NC.

2) Each cell C used in the foregoing embodiments has a conductive separator 4 attached to the oxygen electrode 2. In this case, the intracellular passages p1 act as oxygen-containing gas passages "s".

Alternatively, the cell C may have a conductive separator 4 attached to the fuel electrode 3. In this case, the intracellular passages p1 between the conductive separator 4 and fuel electrode 3 act as fuel gas passages "f", and an intercellular passage p2 between two adjacent cells C acts as an oxygen-containing gas passage "s".

What is claimed is:

1. A fuel cell system having a cell assembly, comprising:
   a plurality of cells each in form of a plate having sides;
   intracellular passages formed in each of said cells;
   intercellular passages each formed between a pair of said cells disposed adjacent each other in a stacking direction of said cells assembly;
   first partition members each in form of an elongate bar having opposite end faces;
   second partition members each having end faces and substantially corresponding to each of said cells in thickness in said stacking direction; and
   column members each erected along a corner of said cell assembly and having a contact surface extending longitudinally of the column member, said contact surface extending, as seen in said stacking direction, at an angle to each of two sides of said cell assembly continuous with said corner;
   wherein said first partition members are arranged in a substantially parallel pair, with each of said opposite end faces placed in tight contact with said contact surface, one of said cells being placed on said first partition members forming a pair, said second partition members being placed between said one of said cells and said columns such that each of said end faces of said second partition members is in tight contact with said contact surface of each of said columns, a further pair of said first partition members being stacked on said one of said cells and said second partition members.

2. A fuel cell system as defined in claim 1, wherein said intracellular passages have openings maintained in gastight condition by a pair of said first partition members arranged above and below said openings and a pair of said second partition members arranged laterally of said openings.

3. A fuel cell system as defined in claim 1, wherein said end faces of said first partition members, said end faces of said second partition members and said contact surface of each of said columns are planar surfaces.

4. A fuel cell system as defined in claim 1, wherein said cells are rectangular, said intracellular passages extending between a pair of sides of each of said cells.

5. A fuel cell system as defined in claim 4, wherein each of said second partition members is in form of an elongate bar having opposite end faces, a pair of said first partition members and a pair of said second partition members being stacked in a parallel cross.

6. A fuel cell system as defined in claim 5, further comprising gas passage defining members attached to four sides of said cell assembly, respectively, wherein those of said gas passage defining members attached to the sides having openings of said intracellular passages define an oxygen-containing gas supply passage and an oxygen-containing gas exhaust passage, respectively, and those of said gas passage defining members attached to the sides without said openings of said intracellular passages define a fuel gas supply passage and a fuel gas exhaust passage, respectively.

7. A fuel cell system as defined in claim 6, wherein each of said gas passage defining members is attached to two of said columns arranged at opposite ends of one side of said cell assembly.

8. A fuel cell system as defined in claim 6, wherein said gas passage defining members are integrated into a cylindrical member having inner peripheral surfaces in contact with outer peripheries of said columns.

9. A fuel cell system as defined in claim 5, wherein one of said pair of said first partition members defines a recess.

10. A fuel cell system as defined in claim 9, further comprising passage inlet defining members each disposed between a pair of said second partition members adjacent each other in said stacking direction.

11. A fuel cell system as defined in claim 9, further comprising gas passage defining members attached to four sides of said cell assembly, respectively, wherein those of said gas passage defining members attached to the sides having openings of said intracellular passages define an oxygen-containing gas supply passage and a common gas exhaust passage, respectively, and those of said gas passage defining members attached to the sides without said openings of said intracellular passages both define fuel gas supply passages.

12. A fuel cell system as defined in claim 11, wherein each of said gas passage defining members is attached to connecting surfaces of two of said columns arranged at opposite ends of one side of said cell assembly.

13. A fuel cell system as defined in claim 9, further comprising two gas passage defining members attached to two sides of said cell assembly having openings of said intracellular passages, respectively, said cell assembly and said two gas passage defining members being enclosed in a box, wherein one of said gas passage defining members attached to a side having said first partition members each defining said recess defines a common gas exhaust passage, and the other gas passage defining member attached to the other side defines an oxygen-containing gas supply passage, said box and said gas passage defining members defining spaces therebetween to act as fuel gas supply passages.

14. A fuel cell system as defined in claim 13, wherein each of said gas passage defining members is attached to connecting surfaces of two of said columns arranged at opposite ends of one side of said cell assembly.

15. A fuel cell system as defined in claim 5, further comprising three gas passage defining members attached to two sides of said cell assembly having openings of said intracellular passages, and to one side of said cell assembly having openings of said intercellular passages, respectively, said cell assembly and said three gas passage defining members being enclosed in a box.

16. A fuel cell system as defined in claim 15, wherein each of said gas passage defining members is attached to connecting surfaces of two of said columns arranged at opposite ends of one side of said cell assembly.

17. A fuel cell system as defined in claim 15, wherein said gas passage defining members attached to the sides having the openings of said intracellular passages define an oxygen-containing gas supply passage and an oxygen-containing gas exhaust passage, respectively, the gas passage defining member attached to said one side of said cell assembly having the openings of said intercellular passages defines a fuel gas supply passage, and a space formed between said box and said gas passage defining members and including the other side having the openings of said intercellular passage defines a fuel gas exhaust passage.

18. A fuel cell system as defined in claim 15, wherein said gas passage defining members attached to the sides having the openings of said intracellular passages define an oxygen-containing gas supply passage and an oxygen-containing gas exhaust passage, respectively, the gas passage defining member attached to said one side of said cell assembly having the openings of said intercellular passages defines a fuel gas exhaust passage, and a space formed between said box and said gas passage defining members and including the other side having the openings of said intercellular passage defines a fuel gas supply passage.

19. A fuel cell system as defined in claim 4, wherein said second partition members are spacers each having a first tight contact surface and second tight contact surfaces.

20. A fuel cell system as defined in claim 19, further comprising gas passage defining members attached to four sides of said cell assembly, respectively, wherein those of said gas passage defining members attached to the sides having openings of said intracellular passages define an oxygen-containing gas supply passage and an oxygen-containing gas exhaust passage, respectively, and those of said gas passage defining members attached to the sides without said openings of said intracellular passages define a fuel gas supply passage and a fuel gas exhaust passage, respectively.

21. A fuel cell system as defined in claim 20, wherein each of said gas passage defining members is attached to two of said columns arranged at opposite ends of one side of said cell assembly.

22. A fuel cell system as defined in claim 20, wherein said gas passage defining members are integrated into a cylindrical member having inner peripheral surfaces in contact with outer peripheries of said columns.

23. A fuel cell system as defined in claim 19, wherein one of said pair of said first partition members defines a recess.

24. A fuel cell system as defined in claim 23, further comprising passage inlet defining plates each disposed at a side of said cell assembly without openings of said intracellular passages.

25. A fuel cell system as defined in claim 23, further comprising gas passage defining members attached to four sides of said cell assembly, respectively, wherein those of said gas passage defining members attached to the sides having openings of said intracellular passages define an oxygen-containing gas supply passage and a common gas exhaust passage, respectively, and those of said gas passage defining members attached to the sides without said openings of said intracellular passages both define fuel gas supply passages.

26. A fuel cell system as defined in claim 25, wherein each of said gas passage defining members is attached to connecting surfaces of two of said columns arranged at opposite ends of one side of said cell assembly.

27. A fuel cell system as defined in claim 23, further comprising two gas passage defining members attached to two sides of said cell assembly having openings of said intracellular passages, respectively, said cell assembly and said two gas passage defining members being enclosed in a box, wherein one of said gas passage defining members attached to a side having said first partition members each defining said recess defines a common gas exhaust passage, and the other gas passage defining member attached to the other side defines an oxygen-containing gas supply passage, said box and said gas passage defining members defining spaces therebetween to act as fuel gas supply passages.

28. A fuel cell system as defined in claim 27, wherein each of said gas passage defining members is attached to connecting surfaces of two of said columns arranged at opposite ends of one side of said cell assembly.

29. A fuel cell system as defined in claim 19, further comprising three gas passage defining members attached to two sides of said cell assembly having openings of said intracellular passages, and to one side of said cell assembly having openings of said intercellular passages, respectively, said cell assembly and said three gas passage defining members being enclosed in a box.

30. A fuel cell system as defined in claim 29, wherein each of said gas passage defining members is attached to connecting surfaces of two of said columns arranged at opposite ends of one side of said cell assembly.

31. A fuel cell system as defined in claim 29, wherein said gas passage defining members attached to the sides having the openings of said intracellular passages define an oxygen-containing gas supply passage and an oxygen-containing gas exhaust passage, respectively, the gas passage defining member attached to said one side of said cell assembly having the openings of said intercellular passages defines a fuel gas supply passage, and a space formed between said box and said gas passage defining members and including the other side having the openings of said intercellular passage defines a fuel gas exhaust passage.

32. A fuel cell system as defined in claim 29, wherein said gas passage defining members attached to the sides having the openings of said intracellular passages define an oxygen-containing gas supply passage and an oxygen-containing gas exhaust passage, respectively, the gas passage defining member attached to said one side of said cell assembly having the openings of said intercellular passages defines a fuel gas exhaust passage, and a space formed between said box and said gas passage defining members and including the other side having the openings of said intercellular passage defines a fuel gas supply passage.

33. A fuel cell system as defined in claim 1, wherein each of said cells includes an electrolyte layer having an oxygen electrode applied to one surface thereof and a fuel electrode applied to the other surface, and a conductive separator attached to said oxygen electrode to define said intracellular passages opposed to said oxygen electrode, said conductive separator having a plate-like portion, strip-shaped projections and ridges as integral parts thereof.

34. A fuel cell system as defined in claim 1, wherein each of said intercellular passages is filled with a fuel-side flexible conductive material comprising a felt-like nickel material or other appropriate material having excellent resistance to heat and reduction.

35. A fuel cell system as defined in claim 34, wherein at least one of said intercellular passages formed in said cell assembly includes a water-cooled jacket mounted therein.

36. A fuel cell system as defined in claim 1, wherein said cells are stacked in a plurality of cell rows.

* * * * *